US010555010B2

(12) United States Patent
Raduchel et al.

(10) Patent No.: US 10,555,010 B2
(45) Date of Patent: Feb. 4, 2020

(54) NETWORK-ENABLED GRAPHICS PROCESSING MODULE

(71) Applicant: LIQUIDSKY SOFTWARE, INC., New York, NY (US)

(72) Inventors: William J. Raduchel, Palo Alto, CA (US); Ian McLoughlin, New York, NY (US); Timothy Miller, New York, NY (US)

(73) Assignee: LiquidSky Software, Inc., New York, NY (US)

( * ) Notice: Subject to any disclaimer, the term of this patent is extended or adjusted under 35 U.S.C. 154(b) by 0 days.

(21) Appl. No.: 15/685,941

(22) Filed: Aug. 24, 2017

(65) Prior Publication Data

US 2018/0063555 A1 Mar. 1, 2018

Related U.S. Application Data

(60) Provisional application No. 62/379,132, filed on Aug. 24, 2016.

(51) Int. Cl.
*H04N 21/218* (2011.01)
*G06F 9/451* (2018.01)
*G06F 9/455* (2018.01)

(52) U.S. Cl.
CPC ......... *H04N 21/2181* (2013.01); *G06F 9/452* (2018.02); *G06F 9/45533* (2013.01); *G06F 2009/45575* (2013.01)

(58) Field of Classification Search
CPC .... H04N 7/106; H04N 21/43637; H04N 7/20; H04N 21/4622; H04N 21/2181;
(Continued)

(56) References Cited

U.S. PATENT DOCUMENTS 8,191,101 B2 * 5/2012 Baran ................... H04N 7/173
9,602,437 B1 * 3/2017 Bernath ............. H04L 49/3054
(Continued)

FOREIGN PATENT DOCUMENTS

WO WO2003/010975 2/2003

OTHER PUBLICATIONS

Notification of Transmittal of the International Search Report and the Written Opinion of the International Searching Authority issued in PCT/US2017/048473 dated Nov. 6, 2017, 12 pages.

*Primary Examiner* — Benjamin R Bruckart
*Assistant Examiner* — Anthony Bantamoi
(74) *Attorney, Agent, or Firm* — Fish & Richardson P.C.

(57) ABSTRACT

A system disclosed within this document is capable of improving performance in virtual computing environments, e.g., by reducing latency associated with streaming video data between a client device and an associated server system over a network. As discussed in detail below, such performance improvements can be achieved using techniques that avoid, reduce and/or overlap operations that are executed by the server system in order to render, encode, and/or transmit video data to a client device over a network. Such techniques can be used to reduce propagation and/or processing delays imposed by, for example, the server system's CPU operations, input/output (I/O), infrastructure, NIC, OS processes, among other types of hardware and software-based overheads. In various implementations, the performance enhancements can be realized at the rendering, encoding, or transmission operations performed by the server system.

7 Claims, 13 Drawing Sheets

(58) Field of Classification Search
CPC ... H04L 12/2801; G06F 9/452; G06F 9/4445; G06F 9/45533; G06F 2009/45575
See application file for complete search history.

(56) References Cited

U.S. PATENT DOCUMENTS

| | | | |
|---|---|---|---|
| 2002/0031120 A1* | 3/2002 | Rakib | H04L 49/15 370/386 |
| 2008/0211818 A1 | 9/2008 | Cantin | |
| 2009/0254683 A1 | 10/2009 | Camer | |
| 2010/0013839 A1* | 1/2010 | Rawson | G06F 13/14 |
| 2011/0103472 A1* | 5/2011 | Lefebvre | H04N 7/32 |
| 2014/0185612 A1 | 7/2014 | Ilyadis | |
| 2014/0281023 A1* | 9/2014 | Apte | H04L 29/06 |
| 2014/0285497 A1* | 9/2014 | Fonseca | G06T 1/20 |
| 2014/0286438 A1* | 9/2014 | Apte | H04N 19/00545 375/240.26 |
| 2016/0246540 A1* | 8/2016 | Blagodurov | G06F 3/064 |
| 2016/0381189 A1* | 12/2016 | Caulfield | H04L 69/165 |
| 2017/0351316 A1* | 12/2017 | Vratonjic | G06F 1/324 711/154 |
| 2018/0004693 A1* | 1/2018 | MacNamara | G06F 13/28 |

* cited by examiner

NETWORK-ENABLED GRAPHICS PROCESSING MODULE

CROSS-REFERENCE TO RELATED APPLICATION

This application claims the benefit of U.S. Provisional Application No. 62/379,132, filed Aug. 24, 2016, which is incorporated by reference in its entirety.

FIELD

The present specification generally relates to virtualized remote computing systems, and more particularly to graphics processing units (GPUs) used in connection with such systems.

BACKGROUND

Remote computing systems can enable users to remotely access hosted resources. Servers on remote computing systems can execute programs and transmit signals for providing a user interface on client devices that establish communications with the servers over a network. The network may conform to communication protocols such as the TCP/IP protocol. Each connected client device may be provided with a remote presentation session such as an execution environment that provides a set of resources. Each client can transmit data indicative of user input to the server, and in response, the server can apply the user input to the appropriate session. The client devices may use remote streaming and/or presentation protocols such as the remote desktop protocol (RDP) or remote frame buffer protocol (RFB) to remotely access resources provided by the server.

Hardware virtualization refers to the creation of a virtual machine that remotely access resources of a server computer with an operating system (OS). Software executed on these virtual machines can separated from the underlying hardware resources. In such arrangements, a server system refers to the physical computer on which virtualization takes place, and client devices that remotely accesses resources of the server system are referred to as client devices. Hardware virtualization may include full virtualization, where complete simulation of actual hardware is allowed to run unmodified, partial virtualization, where some but not all of the target environment attributes are simulated, and para-virtualization, where a hardware environment is not simulated but some guest programs are executed in their own isolated domains as they are running on a separate system.

SUMMARY

Video data that is streamed within a virtual computing environment often involves operations performed by various hardware components of a server system. For instance, a GPU of the server system initially performs a set of mathematical and geometric calculations for graphics rendering, and a set of image processing operations to encode video data. A computer processing unit (CPU) of the server system then further processes the encoded video data using a set of video streaming protocol and then converts the encoded video data to stream data that can be rendered on a client device. A network interface card (NIC) of the server system finally converts the stream data into network packets that are transmitted to client devices over a network.

Systems that operate within virtual computing environments often experience latency between the server system and the client devices when streaming large video data (e.g., high definition video, gaming data). Latency can be caused by, for example, a high bandwidth required to stream video data over a virtual network, available download and upload speeds over the virtual network, and/or hardware capabilities of both the server system and the guest computer.

In some instances, latency results from propagation and/or processing delays associated with operations performed by the hardware components of the server system, e.g., generating, processing, encoding, and transmitting data packets between different components of the server system, due to the hardware configuration of server system. For example, when a GPU completes rendering of a video frame, framebuffer data of the GPU is copied to host memory. The frame is compressed by one or more central processing units (CPUs) of the server system. The CPUs transmit the compressed data to a network interface controller (NIC) of the server system. In this example, the server system performs two instances of data copying, e.g., to and from host memory. This often results in increased computation time and/or increased main memory bandwidth demands.

In other instances, a server system can use GPUs that have integrated video encoders. The integrated video encoders compress a video frame in graphics memory and temporarily stores the compressed video frames to an allocated region of the graphics memory. In such instances, although CPU overhead is reduced compared to the instances discussed above, the GPU (instead of the CPUs) typically experience memory bandwidth bottlenecks. Once the GPU completes video compression, encoded video data is initially copied to host memory, e.g., memory associated with the CPUs, and then copied from the host memory to the NIC, which can also cause propagation and/or processing delays. In some instances, the integrated video encoders are capable of transmitting compressed video frames directly to the NIC, e.g., without temporarily storing the compressed video frames in the graphics memory.

As described herein, "integrated" components refer to two or more hardware components that are physically and/or logically configured to minimize use of an I/O infrastructure of a computing system that enables communication between devices. In some examples, integrated components refer to components that are physically located on a single chip, e.g., a chip that includes a GPU, a CPU, and a NIC as discussed below. In other examples, integrated components refer to components that are located on different chips but located on a single printed circuit board (PCB). In both of these examples, integrated components are capable of exchanging data in a more resource-efficient manner compared to components that exchange data over, for example, a typical I/O infrastructure.

To address these and other limitations, a system disclosed within this document is capable of improving performance in virtual computing environments, e.g., by reducing latency associated with streaming video data between a client device and an associated server system over a network. As discussed in detail below, such performance improvements can be achieved using techniques that avoid, reduce and/or overlap operations that are executed by the server system in order to render, encode, and/or transmit video data to a client device over a network. Such techniques can be used to reduce propagation and/or processing delays imposed by, for example, the server system's CPU operations, input/output (I/O), infrastructure, NIC, OS processes, among other types of hardware and software-based overheads. In various implementations, the performance enhancements can be realized at the rendering, encoding, or transmission operations performed by the server system.

The system is capable of achieving the performance enhancements using various techniques discussed within this document. In some implementations, the system is capable of using software-based techniques that adjust the programming and/or functioning of commercial off-the-shelf (COTS) hardware of a server system, e.g., modification of software drivers of one or more of the GPU, the CPUs, and/or the NIC of the server system. For example, if video encoding is performed by software on the server system, then the video encoder can be modified to transmit its output to a network stack of the NIC of the server system as it is being generated. In this and other examples, such modifications can be used to avoid, reduce, and/or overlap operations executed by the server system as described above and discussed in detail below.

Alternatively, or in addition, the system is capable of using hardware-based techniques that employ a specialized graphics architecture (referred throughout as a "network-enabled graphics processing module" or "NEGPM"). The physical and/or logical arrangement of the CPUs, GPU, and/or NIC on the NEGPM can be customized to reduce copying and/or buffering when rendering, encoding, or transmitting video data by the server system. As an example, the NEGPM can be a single chip that includes a GPU, one or more integrated CPUs, and/or an integrated NIC. In this example, the integrated CPUs and the integrated NIC can operate independently of the host CPUs and the host NIC of the server system such that the integrated CPUs and/or the integrated NIC perform one or more of the rendering, encoding, or transmission operations without using system resources associated with the host CPUs and the host NIC.

The subject matter described within this document can provide various technical advantage to a server system that transmits video data to a client device within a virtual computing environment. As an example, a server system that includes a NEGPM can perform operations relating to video streaming without significant usage of the host CPUs of the server system, thereby reducing the computational burden, e.g., reduction of copy latencies and/or memory bandwidth demands, which are imposed on the host CPUs when rendering, encoding, and/or transmitting video data.

As another example, the NEGPM may render and encode video data into a direct stream, and then process the data using a network streaming protocol (e.g., RTSP) through an integrated NIC without using the host NIC of the server system, thereby increasing bandwidth allocation on the host NIC. In this example, the host NIC may convert the stream data into network packet data, e.g., by encapsulating video data to include network protocol headers. The integrated NIC then outputs the network packet data independently of the host NIC. In this regard, because the NEGPM does not utilize the host CPU and/or the host NIC of the server system to perform operations, the overall network load on the host NIC, and the number of operations performed by the host CPU, can be reduced.

As described below, video data, e.g., raw rendered video frames or encoded video frames, can be temporarily stored in various types of memory such as host memory associated with a host CPU of a server system, dedicated memory of a GPU, or dedicated memory of a host NIC of the server system. In various implementations, server systems described within this document are capable of accessing these different types of memory in relation to the processing operations discussed throughout.

In one general aspect, a system includes: one or more central processing units; a graphics processing unit; a network interface controller configured to exchange data packets with client devices connected to the system over a network; and one or more non-transitory computer-readable storage devices storing instructions. The stored instructions, when executed by the one or more central processing units, cause the graphics processing unit to perform operations that include: rendering one or more frames of video data to be transmitted to a client device from among the client devices; encapsulating the one or more rendered frames of video data to include one or more network protocol headers of the network interface controller; and providing the encapsulated video data to the network interface controller.

One or more implementations can include the following optional features. For example, in some implementations, the operations further include encoding the one or more rendered frames of video data to generate encoded video data. In such implementations, encapsulating the one or more rendered frames of video data includes encapsulating the encoded video data to include the one or more network protocol headers of the network interface controller.

In some implementations, rendering the one or more frames of video data includes encapsulating, prior to encoding the one or more rendered frames, the one or more frames of video data to include one or more network protocol headers associated with the network interface controller.

In some implementations, encoding the one or more rendered frames of video data includes: encoding a first portion of the one or more rendered frames of video data; encoding a second portion of the one or more rendered frames of video data that is different than the first portion; and providing the encoded first portion to the network interface controller while encoding the second portion.

In some implementations, the graphics processing unit include (i) a video renderer configured to render the one or more frames of the video data to be transmitted to the client device, (ii) a video encoder configured to encode the one or more rendered frames of the video data, and (iii) graphics memory for temporarily storing the encoded video data. In such implementations, providing, using a peripheral interconnect, the encapsulated video data to the network interface controller comprises providing encoded video data temporarily stored on the graphics memory to the network interface controller.

In some implementations, the encoded video data temporarily stored on the graphics memory is provided to the network interface controller without accessing memory associated with the one or more central processing units.

In some implementations, the encoded video data temporarily stored on the graphics memory is provided to the network interface controller without accessing system resources associated with the one or more central processing units.

In some implementations, the graphics processing unit is configured to (i) encode the one or more rendered frames of the video data to generate the encoded video data, and (ii) provide, using a peripheral interconnect, the encoded video data for temporary storage in memory associated with the one or more central processing units.

In some implementations, providing the encapsulated video data for output to the network interface controller includes: retrieving the encoded video data temporarily stored in the memory associated with the one or more central processing units; and providing the encoded video data retrieved from the memory associated with the one or more central processing units to the network interface controller.

In some implementations, the encoded video data temporarily stored in the memory associated with the one or more central processing units is retrieved by the network interface controller using direct memory access.

In some implementations, the network interface controller is configured to encapsulate the one or more rendered frames to include the one or more network protocol headers.

In a second general aspect, a system includes: one or more central processing units; a graphics processing unit comprising an integrated network interface controller, the integrated network interface controller being configured to exchange data packets with client devices connected to the system over a network; and one or more non-transitory computer-readable storage devices storing instructions. The stored instructions, when executed by the one or more central processing units, cause the graphics processing unit to perform operations. The operations include: rendering one or more frames of video data to be transmitted to a client device from among the client devices; processing the one or more rendered frames of video data to generate processed video data; encapsulating the processed video data to include one or more network protocol headers of the network interface controller; and providing the encapsulated video data to the integrated network interface controller.

One or more implementations can include the following optional features. In some implementations, the graphics processing unit further includes (i) a video renderer configured to render the one or more frames of the video data to be transmitted to the client device, and (ii) a video encoder configured to process the one or more rendered frames of the video data, and (iii) graphics memory for temporarily storing the encapsulated video data. In such implementations, providing the encapsulated video data to the integrated network interface controller comprises providing encapsulated video data temporarily stored on the graphics memory to the integrated network interface controller.

In some implementations, the encapsulated video data temporarily stored on the graphics memory is provided to the network interface controller without accessing memory associated with the one or more central processing units.

In some implementations, the processed video data is encapsulated without accessing (i) graphics memory of the graphics processing unit and (ii) host memory of the system; and the encapsulated video data is provided to the network interface controller without accessing (i) the graphics memory of the graphics processing unit and (ii) the host memory of the system.

In some implementations, the one or more central processing units are integrated central processing units that are configured to exchange direct communications with the graphics processing unit.

In some implementations, processing the one or more rendered frames of video data includes: encoding a first portion of the one or more rendered frames of video data; encoding a second portion of the one or more rendered frames of video data that is different than the first portion; and providing the encoded first portion to the network interface controller while encoding the second portion.

In some implementations, the graphics processing unit is configured to (i) process the one or more rendered frames of the video data to generate the processed video data, and (ii) provide, using a peripheral interconnect, the processed video data for temporary storage in memory associated with the one or more central processing units.

In some implementations, providing the encapsulated video data for output to the integrated network interface controller includes: retrieving the processed video data temporarily stored in the memory associated with the one or more central processing units; and providing the processed video data retrieved from the memory associated with the one or more central processing units to the integrated network interface controller.

In some implementations, the graphics processing unit and the one or more central processing units are integrated on a single chip such that the graphics processing unit and each of the one or more central processing units share caching and physical memory spaces on the chip.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
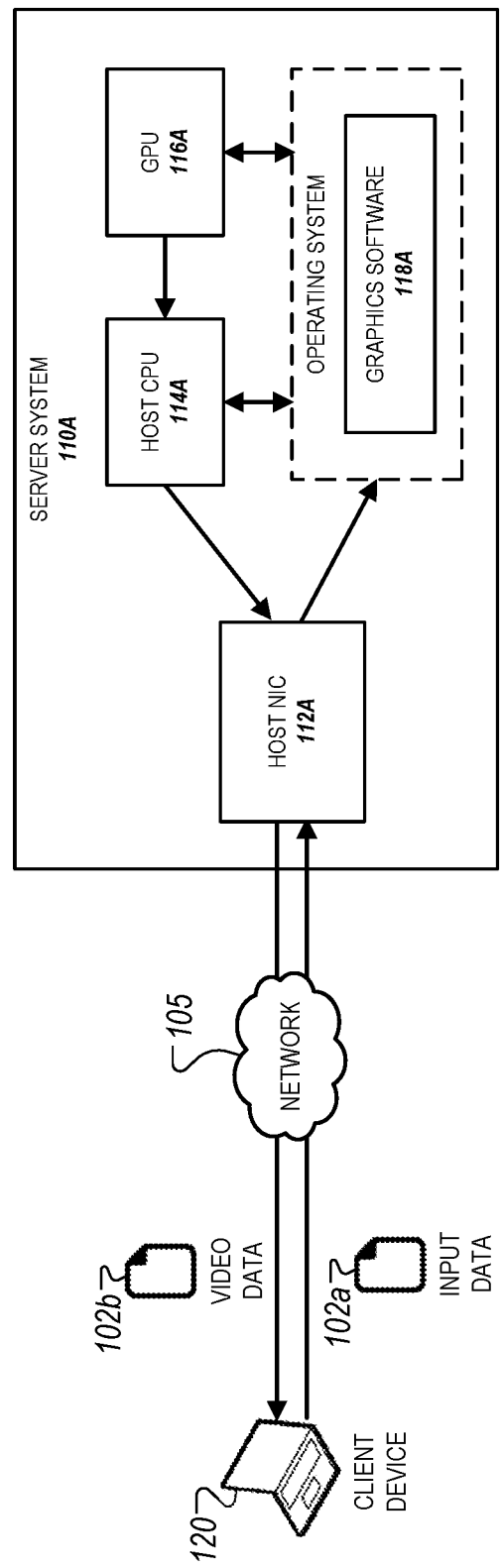
FIGS. 1A-B illustrate examples of systems that can be used to provide a virtual computing environment between a server system and a client device.
Figure 1B:
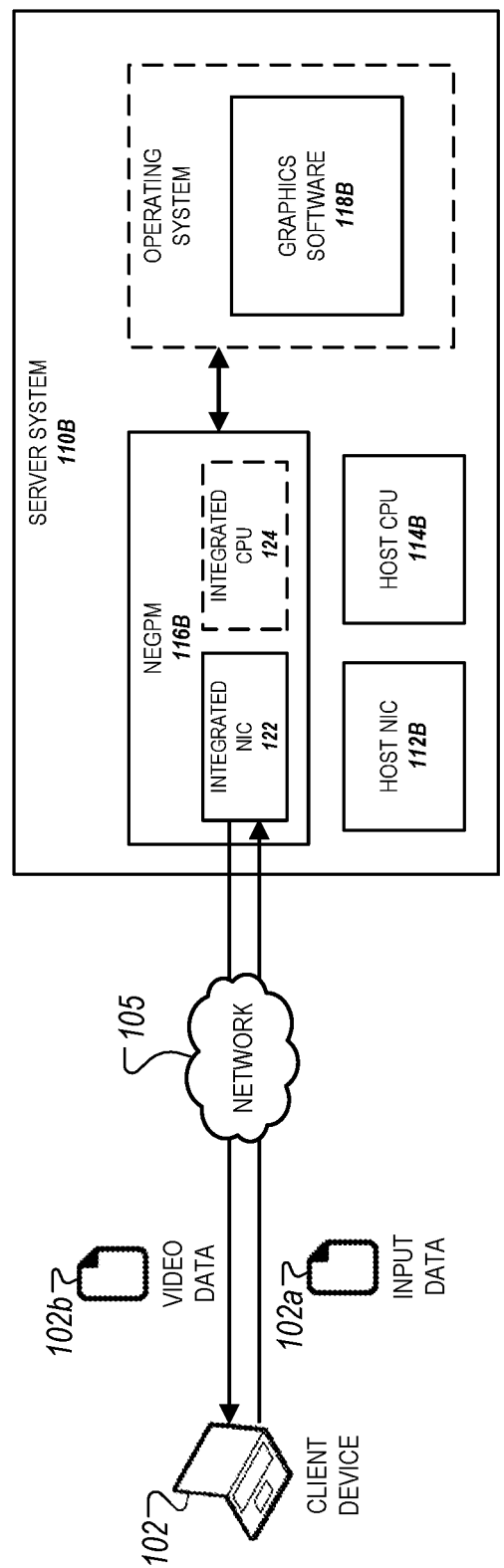

FIGS. 1A-B illustrate examples of systems 100A and 100B that can be used to provide a virtual computing environment between a server system, e.g., server systems 100A and 100B and a client device 120 over a network 105. The server system 100A generally represents a server system that employs COTS hardware, e.g., an aftermarket GPU, whereas the server system 100B generally represents a server system that employs customized hardware, e.g., the NEGPM. The server systems 100A and 100B are capable of being configured to reduce latency associated with streaming video data over the network 105 as discussed below. The descriptions below that provided in reference to "server system 110" refer to descriptions that are applicable to both the server systems 110A and 110B.

During a typical streaming operation, the client device 120 initially captures user input data provided by a user through a suitable peripheral device, e.g., a keyboard and mouse, a remote, a controller, etc. The client device 120 encodes the captured user input data as user input data 102a, which is then transmitted to the server system 110 over the network 105. The server system 110 processes the user input data 102a using, for example, software running in a virtual machine such as graphics application package interfaces (APIs), to compute a response to the received user input data 102a. The computed response is used to generate and process video data 102b, which is provided for output to the client device 120. As an example, the client device 120 may receive user input relating to a game that is being remotely accessed on the client device 120 and running locally on a virtual machine on the server system 110. In this example, user input is used to adjust video that is displayed on a screen of the client device 120.

To generate the video data 102b provided for output, the server system 110 initially renders video frames that a user is supposed to see using, for example, a GPU. The rendered video frames are then encoded using a compression technology, e.g., h.264, MPEG, in order to reduce the file size of the video data to be transmitted over the network 105 for example. The encoded video data is transmitted over the network 105 to the client device 120. The client device 120 decodes the encoded video within the video data 102b and displays the decoded video on an associated display device such as a screen of the client device 120 or a monitor connected to the client device 120.

As discussed throughout, a streaming operation often creates latency between a time point when the user input data 102a is received by the client device 120 and a time point when the video data 102b is displayed to the user. For example, a 15-30 millisecond delay can result from a streaming operation, which can often be perceptible to some users of the client device 120. Although some aspects of latency can be controlled, e.g., by ensuring that the client device 120 and the server system 110 have high network bandwidth or by ensuring that the devices are within a geographic proximity, latency attributed to propagation and/or processing delays can result based on how rendering, encoding, and/or transmission of the video data 102b within the server system 110.

Referring now to components depicted in FIGS. 1A-B, server systems 110A and 110B may represent any type of computer system (e.g., network server, media server, home network server, etc.) that are capable of performing network-enabled functions. The client device 120 can be any suitable network-enabled device that is capable of accessing and transmitting data associated with a set of shared resources accessed and/or provided through the server systems 110A and 110B. For example, the client device 120 can be one or more of a smartphone, a laptop computing device, a tablet computing device, a desktop computing device, a wearable device, or any other type of suitable personal or enterprise computing device. Although a single guest device 120 is depicted in FIGS. 1A-B for simplicity, the server systems 110A and 110B can be configured to exchange communications with multiple client devices over the network 105.

The network 105 may include, for example, one or more of the Internet, Wide Area Networks (WANs), Local Area Networks (LANs), Wi-Fi, analog or digital wired and wireless telephone networks, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The host NICs 112A and 112B can be any suitable network interface card, network adapter, or any other types of network device, the exact configuration of which may depend based on the type of network 105. The host CPUs 114A and 114B can include at least one processor that obtain instructions via a bus from main memory of the server system. The CPUs 114A and 114B can be any processor adapted to support the techniques described throughout. The main memory may be any memory sufficiently large to hold the necessary programs and data structures. For instance, the main memory may be one or a combination of memory devices, including Random Access Memory (RAM), non-volatile or backup memory (e.g., programmable or Flash memory, read-only memory, etc.).

The server system 110 may also include an OS used for managing the operation of the host and loaded from the main memory. The server system 110 may also include one or more device drivers that provide an interface between application programs and devices, such as the host NICs 112A, 112B, the CPUs 114A, 114B, and the GPU 116A/NGPM 116B.

Referring now to FIG. 1A, the server system 110A includes hardware such as a host NIC 112A, a host CPU 114A, and a GPU 116A. The server system 110A also includes graphics software 118A that runs on the hardware OS of the server system 110A. As depicted in FIG. 1A, the host NIC 112A handles incoming and outgoing network data packets to and from the client device 120, the GPU 116A and/or graphics software 118A perform rendering and encoding operations, and the host CPU 114A executed logic that controls the operations relating to GPU 116A and the graphics software 118A. In some implementations, the graphics software 118A can include graphics APIs, programs, or other types of code/logic relating to video data processing, e.g., video rendering and encoding.

Figure 3A:
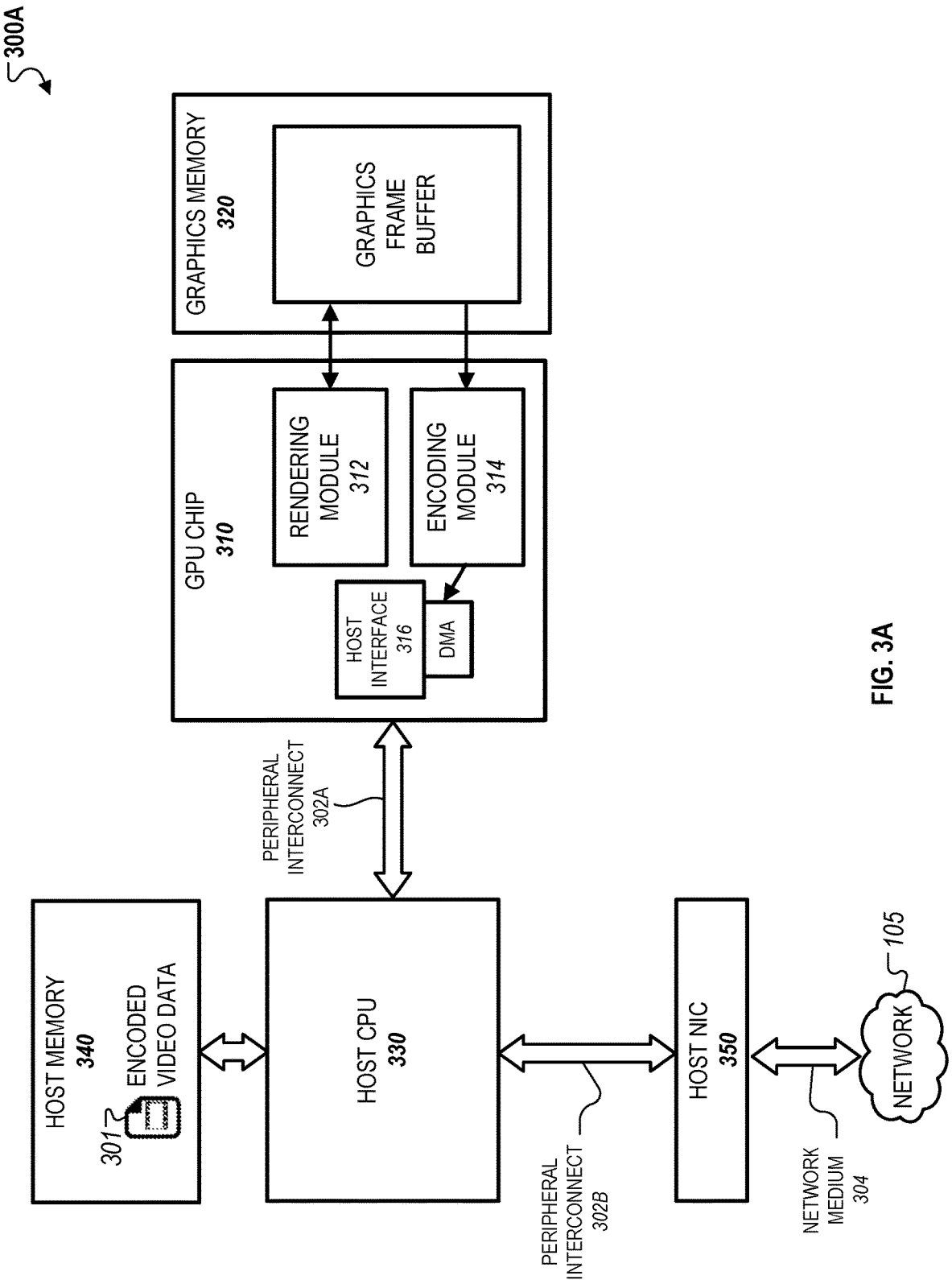
FIGS. 3A-B illustrate examples of server systems that are capable of using software-based techniques to reduce latency in providing interactive services within a virtual computing environment.
Figure 3B:
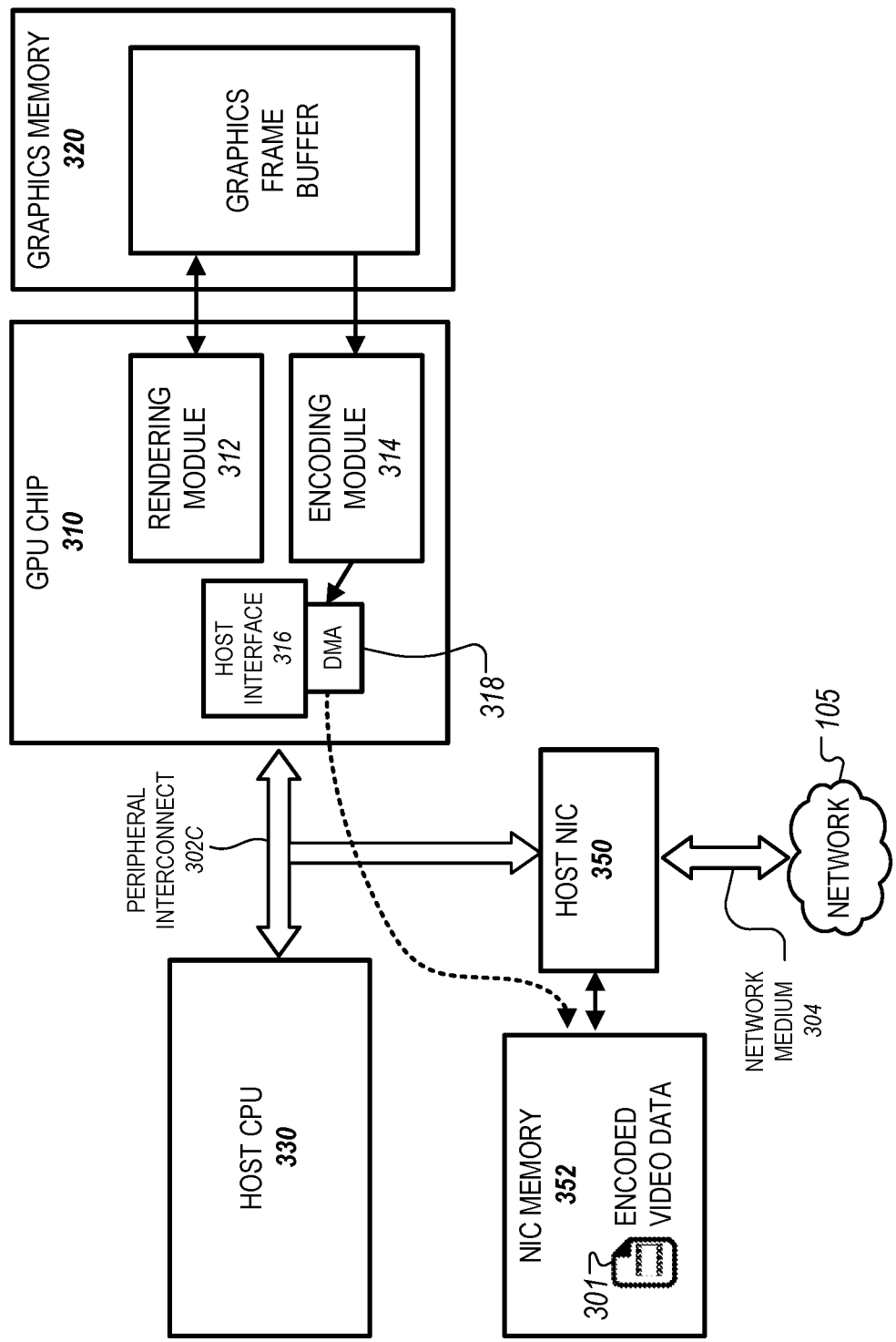

In the example depicted in FIG. 1A, the host NIC 112A, the host CPU 114A, and the GPU 116A can represent COTS hardware that are adjusted to perform operations in a manner that produces reduced latency as discussed in greater detail with respect to FIGS. 3A-B. For example, the software drivers of the host NIC 112A, the host CPU 114A, the GPU 116A and/or the graphics software 118A can be modified (or otherwise recreated) to avoid, reduce, and/or overlap operations relating to video data processing as discussed in more detail with respect to FIGS. 3A-B.

Referring now to FIG. 1B, the server system 100B includes hardware such as a host NIC 112B, a host CPU 114B, and a NEGPM 116B. The server system 110B also includes graphics software 118B that runs on the hardware OS of the server system 110B. In some instances, the host NIC 112B, the host CPU 114B, and/or the graphics software 118B can operate in a similar manner to corresponding components of the system 100A as described above in reference to FIG. 1A.

Figure 4A:
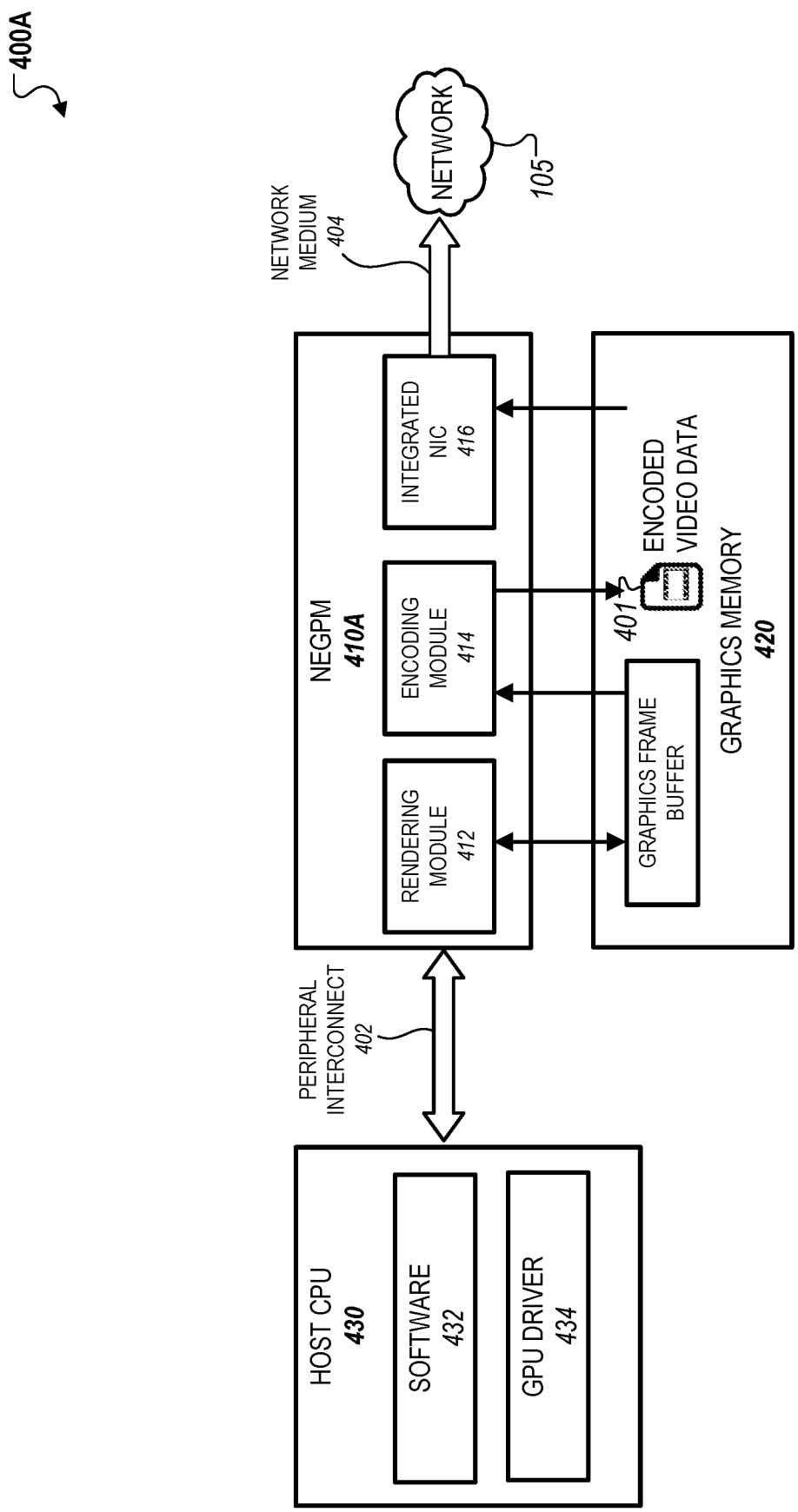
FIGS. 4A-C illustrate examples of server systems that are capable of using specialized hardware to reduce latency in providing interactive services within a virtual computing environment.
Figure 4B:
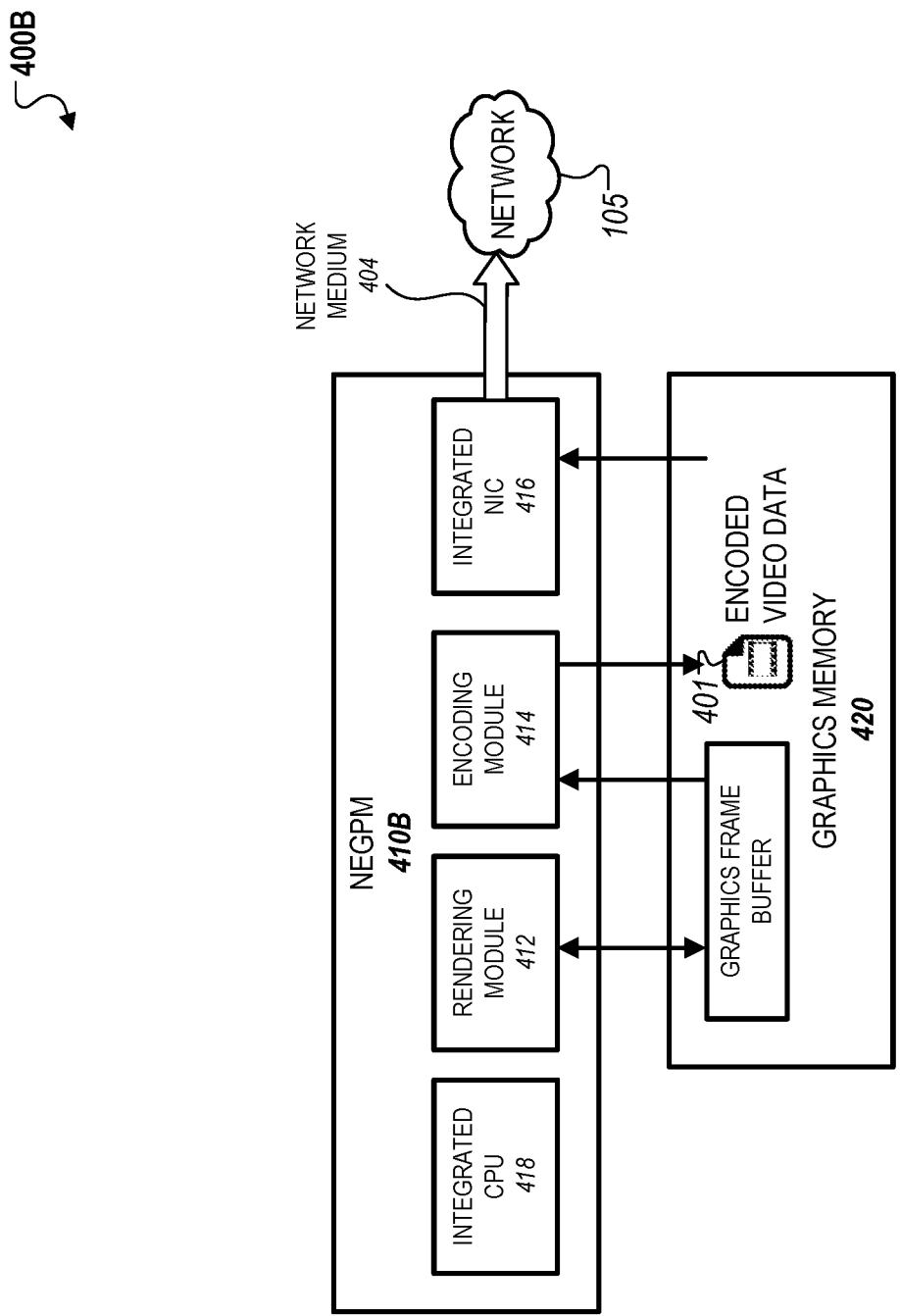

As depicted in FIG. 1B, the NEGPM 116B includes an integrated NIC 122, a GPU (not shown), and, optionally, an integrated CPU 124. For example, in some implementations, the NEGPM 116B includes only the integrated NIC 122 but not a dedicated CPU (as shown in FIG. 4A), whereas in other implementations, the NEGPM 116B includes both the NIC 122 and integrated CPU 124 (as shown in FIG. 4B).

The NEGPM 116B can be a separate hardware device that is attached to the motherboard of the server system 110B using a computer bus. The GPU, the integrated NIC 122, and the integrated CPU 124 can be integrated into a circuit board that is attached to the motherboard of the server system 110. Additionally, or alternatively, in some implementations, the NEGPM 116B may not necessarily be separate hardware components, but integrated into the motherboard of the server system 110B.

The GPU of the NEGPM 116B can be designed to rapidly manipulate and alter memory to accelerate the creation of images in a frame buffer intended for output to a display associated with the client device 120, e.g., through a virtual computing environment provided through the network 105. The GPU can be capable of manipulating computer graphics and image processing and encoding video streams using specific encoding algorithms.

The GPU of the NEGPM 116B can function in a manner that is consistent with the functions of the GPU 116A as discussed above in reference to FIG. 1A. For example, the GPU of the NEGPM 116B can render video frames in a framebuffer, encode video frames using a video compression engine (if it includes a hardware-based encoder), and/or transmit data between an associated graphics memory and memory associated with either the integrated NIC 122, e.g., integrated NIC memory, or the integrated CPU 124, e.g., integrated CPU memory. NEGPM 116B can also include a dedicated RAM and CPU 124 that enable the NEGPM 116B to perform matrix and vector operations that are often performed by GPUs, e.g., rendering texture mappings, accelerating geometrics calculations, manipulating vertices and textures, using oversampling and interpolation techniques to reduce aliasing, or using high-precision color matrix spaces. In this regard, the NEGPM 116B may be used as a substitute for a typical GPU that is configured to the motherboard of the server system 110B.

In some implementations, NEGPM 116B can be configured to supplement and/or perform a set of operations in tandem with the integrated and/or discrete GPU of the server system 110B, e.g., a separate host GPU. In such implementations, the NEGPM 116B may be a separate device from the host GPU of the server system 110B that complements the execution of operations carried out by the host GPU of the server system 110B. For example, the NEGPM 116B and the host GPU of the server system 110B may be configured in a parallel processing arrangement, e.g., Scalable Link Interface, to improve the processing power available for graphics.

The integrated NIC 122 can be a hardware component that connects the NEGPM 116B to the network 105 independently of the host NIC 112B of the server system 110B. For instance, the integrated NIC 122 can be configured to convert data generated and encoded by the integrated GPU of the NEGPM 116B into network data packets, which are then transmitted to the client device 120 over the network 105 during a typical video streaming session. The integrated NIC 122 can include components that enable the NEGPM 116B to have similar network capabilities as that of the host NIC 112B. For example, the integrated NIC 122 may be used as either as a physical layer device and/or a data link layer device by providing physical access to a networking medium and providing a low-level addressing system through the use of media access control (MAC) addresses that are uniquely assigned to network interfaces.

The integrated NIC 122 can be configured with various network interface controllers to enable the NEGPM 116B to connect to the network 105. As examples, the integrated NIC 122 may include network interfaces that are based on one or more families of computer networking technologies such as, for example, Ethernet, USB-C, Lightning Port, among others.

As described above, the NEGPM 116B can be used to improve the streaming performance of the server system 110B over the network 105 by providing various advantages. For example, the NEGPM 116B can integrate capabilities of different components that are typically physically separated, e.g., a CPU, a GPU, and a NIC, on a single chip such that the components share caching and physical memory spaces on the chip. As an example, because the integrated NIC 122, the integrated CPU 124, and the GPU of the NEGPM 116B can be integrated into a single chip, the NEGPM 116B can be used to perform only essential operations specifically related to the rendering, encoding and transmission of video data through network packets. In this example, NEGPM 116B is not used to perform non-essential operations, e.g., processing metadata associated with video data that is also provided for output, which are instead performed by the host NIC 112B and/or the host CPU 114B. This technique can be used to reduce latency in a video stream transmitted over the network 105 as discussed below with respect to FIGS. 2, 4A-B.

In addition, because the NEGPM 116B includes an integrated NIC 122 that separate and capable of functioning independently from the host NIC 112B, the NEGPM 116B can be used in conjunction with other hardware components of the server system 110 in order to isolate the transmission of video data from other types of data, e.g., control data relating to user input on the client device 120.

The NEGPM 116B may be implemented in various server computers to provide performance improvements in a variety of virtual computing environments. In one example, the NEGPM 116B may be implemented in a data server that provides various client devices with access to remote resources that are run on the data server (e.g., running an installed game on the data server). In this example, the NEGPM 116B can be used to provide a high performance video stream with low latency based on techniques described above. For instance, the GPU of the NEGPM 116B may be used to circumvent needless processing operations performed by the CPU that contribute to latency in the video stream, and the integrated NIC 122 can be used to transmit the encoded video stream to client devices as network data packets.

In another example, the NEGPM 116B can be used to reduce latency associated with financial transactions that involve data transmissions between a client device and a server that houses encrypted financial information. In this example, the NEGPM 116B can be configured to similarly perform a set of customized operations that do not require processing operations to be performed by the host CPU 114B.

In yet another example, similar techniques described above can be used to improve upon the latency associated with graphical elements that are displayed during live multimedia broadcasts. In this example, the NEGPM 116B can be configured to operate on an application server that provides video stream data for graphical elements coinciding with events that are viewable within a live broadcast feed.

Figure 2:
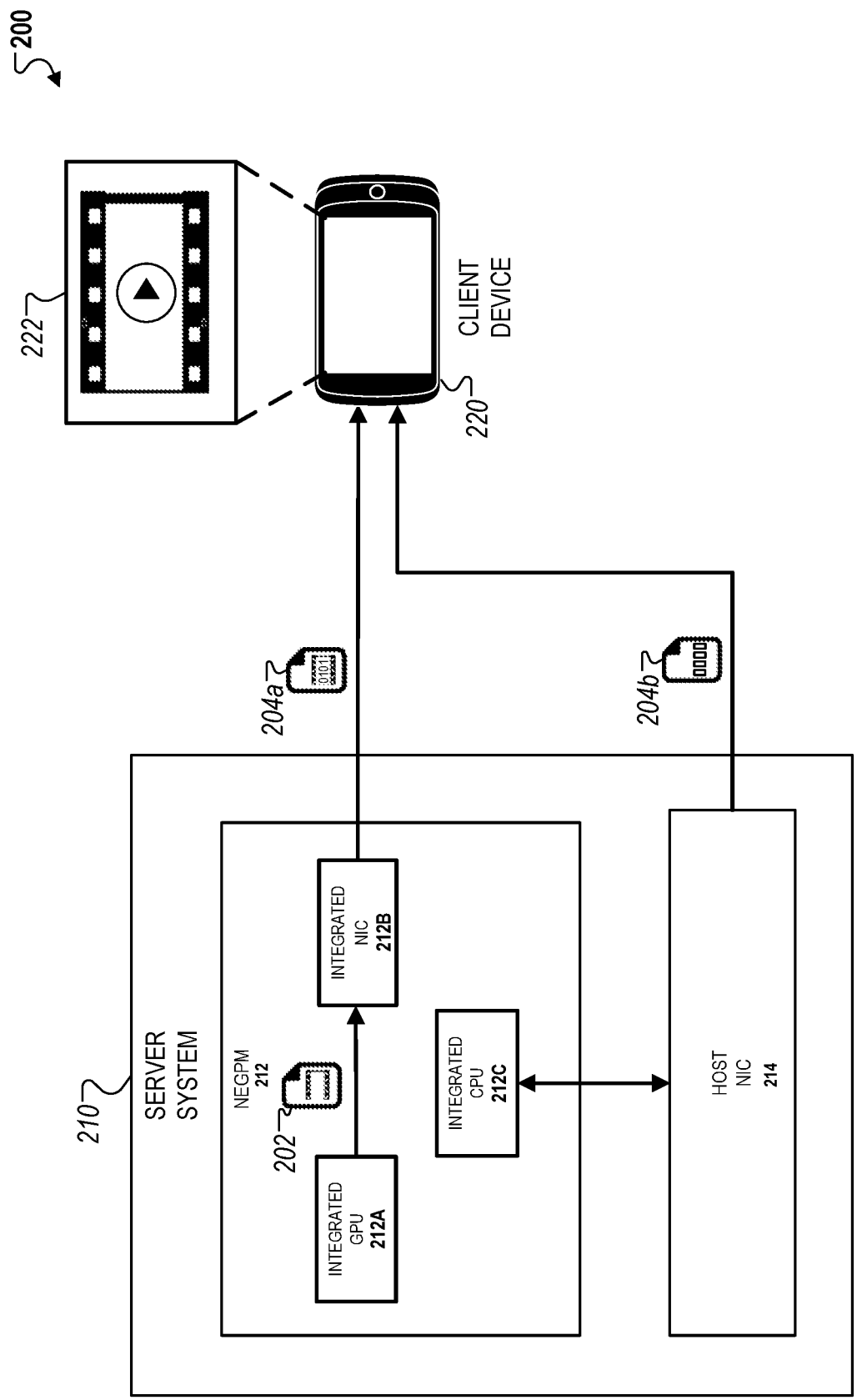
FIG. 2 illustrates an example of a technique for transmitting segmented video data within a virtual computing environment.

FIG. 2 illustrates an example of a technique 200 for transmitting segmented video data within a virtual computing environment. The system 200 includes a server system 210 and a client device 220. In some implementations, the server system 210 can correspond to the server system 110B, and the client device 220 can correspond to the client device 120 as discussed above with respect to FIG. 1B.

As depicted in FIG. 2, the server system 210 includes a NEGPM 212 and a host NIC 214, which are both capable of establishing network communications with a client device 220. The NEGPM 212, in this example, includes an integrated GPU 212A, an integrated NIC 212B, and an integrated CPU 212C. As discussed above, the integrated NIC 212 enables the NEGPM 212 to establish network communications independently of the host NIC 214.

The process depicted in the FIG. 2 illustrates the capability of the server system 210 to transmit video stream data 204a and data 204b associated with a video stream 222 (e.g., control data, metadata, user data, etc.) over separate network interfaces with the use of the NEGPM 212. This technique can be used to improve stream performance over the virtual computing environment.

As shown, the integrated CPU 212C can be configured to selectively process different types of data associated with a virtual computing environment based on categories associated with each type of data. For example, the integrated CPU 212C can be configured to transmit raw graphics data, e.g., texture renderings, and encoding data generated by the integrated GPU 212A for further processing by the integrated NIC 212B, whereas the integrated CPU 212C may transmit other types of data that are not associated with the display of the video stream 222 to the host NIC 214 for further processing. In this regard, the integrated CPU 212C can be used to differentially process different aspects of a video stream 222 in order to minimize a performance load on the NEGPM 212.

In the exemplary streaming process depicted in FIG. 2, the integrated GPU 212a initially renders raw graphics data using techniques similarly to that of a dedicated and/or integrated graphics card of a computing system. The raw graphics data is then encoded by the integrated GPU 212a into encoded data 202 using a particular encoding mechanism. For example, if the raw graphics data relates to playback of a video file, the integrated GPU 212a may compress the raw graphics data into the encoded data 202 using a particular video codec that provides a video compression specification. The encoded data 202 is then transmitted to the integrated NIC 212B. This transmission can be executed by the integrated CPU 212C without accessing (or otherwise using) any computation resources associated with the host CPU (not shown) and/or host NIC 214 of the server system 210. The integrated NIC 212B converts the received encoded data 202, and transmits packet data 204a over a network interface that enables a virtual session between the server system 110 and the client device 220.

In the alternative pathway, the integrated CPU 212C may transmit instructions to the host NIC 214 to process other types of data that are associated with the encoded data 202, but not related to the display of encoded data 202 on the client device 220. For example, as described above, examples of such data can include configuration data for the client device 220, user data indicating preferences and/or prior activity, or control data related to user input provided on the client device 220. The host NIC 214 may then convert such data into network packet data 204b and transmitted over a network interface for decoding on the client device 220.

In some implementations, the network interface for transmitting the network packet data 204a, e.g., through the integrated NIC 212B, and the network interface for transmitting the network packet data 204b, e.g., through the host NIC 214, are separate network interfaces that can be used to isolate the transmission of video stream data, e.g., network packet data 204a, and other types of data within a virtual computing environment, e.g., network packet data 204b. In such implementations, the streaming performance over the virtual computing environment can be improved due to the reduced number of processing and/or transmission operations performed by the NEGPM 210 compared to a host GPU of a server system that coordinates operations with a host CPU of the server system to perform operations for all data associated with the video stream 222.

In addition, such implementations can also be used to enable security features to protect user data over the virtual computing environment without necessarily affecting the processing operations for the network packet data 204a for rendering the video stream 222. For instance, because user data is solely handled and processed by the host NIC 214, the host NIC 214 can be configured to use encryption protocols in generating the network packet data 204b to be transmitted to the client device 220. However, the processing techniques for the network packet data 204a remain unaffected (and therefore causes no decrease in performance) because video stream data is exclusively handled and processed by the network-enabled graphics module. In this regard, the use of separately isolated network interfaces to transmit each of the network packet data 204a and the network packet data 204b can be used to both increase network security of sensitive user information while also maintaining optimal streaming performance during a virtual session.

FIGS. 3A-B illustrate examples of server systems 300A and 300B that are capable of using software-based techniques to reduce latency in providing interactive services within a virtual computing environment. As discussed above, when providing such interactive services, excessive latencies can result in delays perceived by the user between input actions, e.g. input provided on a keyboard, a mouse, and any other suitable input devices, and a system response, e.g. outputted audio and video that have a causal relationship to the submitted input. Server systems 300A and 300B employ different techniques to reduce buffering and copying overheads that often produce latency within a virtual computing environment.

The server systems 300A and 300B include a GPU chip 310, graphics memory 320, a host CPU 330, host memory 340, and a host NIC 350. The GPU chip 310 further includes a rendering module 312 and an encoding module 314, and host interface 316. The graphics memory 320 further includes a graphics framebuffer on which video frames rendered by the rendering module 312 are temporarily stored before being processed by the encoding module 314. In some implementations, the server systems 300A and 300B can correspond to the server system 100A depicted in FIG. 1A and discussed above. For example, the server systems 300A and 300B can employ COTS hardware components that are modified to impart the functionalities discussed below.

As depicted in FIG. 3A, the rendering module 312 can include a combination of executable applications, graphics APIs, and graphics drivers. The graphics drivers enable the host CPU 330 to command the GPU chip 310 through a peripheral interconnect 302A to render one or more video frames to a portion of the graphics memory 320, e.g., within the graphics framebuffer. A "peripheral interconnect," as described herein, can refer to a part of the server system's I/O infrastructure that is used to communicate between the host CPU 330 and peripheral devices. Examples of peripheral interconnects include AGP, PCI, PCI Express, USB, Firewire, Thunderbolt, among others.

When rendering is complete, the encoding module 314 processes, e.g., compresses, the rendered video frames in the graphics framebuffer using a suitable compression engine to generate encoded and/or processed video data. However, instead of storing the encoded video data into the graphics memory 320, the GPU chip 310 performs a direct memory access (DMA) operation to access the host memory 340 associated with the host CPU 330 through the peripheral interconnect 204. A "direct memory access" operation, as described herein, refers to a means by which a peripheral can read and/or write to host memory, e.g., the host memory 340, which is attached to the main CPU of a computing device, e.g., the host CPU 330, via a peripheral interconnect, e.g., the peripheral interconnect 302A. For example, a DMA operation can be used to access dynamic random access memory (DRAM) attached to the host CPU 330.

The encoding module 314 utilizes the peripheral interconnect 302A to write to a region of the host memory 340 and temporarily store the encoded video data 301. A driver running on the host CPU 330, e.g., a driver for the host NIC 350 or a modified graphics driver for the GPU chip 310, sends the encoded video data 301 to the host NIC 350 via a peripheral interconnect 302B for transmission to the network 105 over network medium 304. In this regard, the transmission operation depicted in FIG. 3A avoids the temporary storage of the encoded video data 301 in the graphics memory 320, which can often introduce propagation delays when transmitting the encoded video data 301 to the host NIC 350.

In some implementations, the host NIC 350 can be configured to access the host memory 340 using a DMA operation. For example, the host NIC 350 can be configured to retrieve the encoded video data 301 from the host memory 340 once the encoding module 314 accesses and writes to the host memory 340.

In some implementations, the encoding module 314 may alternatively temporarily store the encoded video data 301 in the graphics memory 320. In such implementations, the encoding module 314 (or the host NIC 350) may retrieve the encoded video data 301 from the graphics memory 320 for transmission to the network 105 over the network medium 304.

In the examples discussed above, the GPU chip 310 is capable of establishing direct communications with the host NIC 350, e.g., using the peripheral interconnects 302A and 302B, to potentially reduce buffering and copying overheads discussed throughout.

Referring now to FIG. 3B, an example of a server system 300B is depicted. In this example, the GPU chip 310 is capable of establishing direct communications with the NIC 350 by performing a DMA operation to access NIC memory 352 of the host NIC 350 using a peripheral interconnect 302C. In this regard, the GPU chip 310 is capable of transmitting the encoded video data 301 to the host NIC 350 without requiring access to the host memory 340, thereby limiting the system resources used by the host CPU 330 and/or reducing the computation burden on the host CPU 330.

As depicted in FIG. 3B, when the encoded video data 301 between the GPU 310 and the host NIC 350, the data may need to be buffered in the NIC memory 352 to accommodate differences in the bitrates of the peripheral interconnect 302C and the network medium 304. Once buffering is complete, the host NIC 350 transmits the encoded video data 301 as network data packets to the network 105 as discussed above. In this example, the host NIC 350 is capable of transmitted the encoded video data 301 immediately after is begins arriving in the NIC memory 352.

In some implementations, the GPU chip 310 is capable of writing its raw output, e.g., rendered video frames from the rendering module 312 or encoded video data 301 from the encoding module 314, from an allocated region of the graphics memory 320 to the host NIC 350. In such implementations, the host NIC 350 may operate as a passive NIC that relays data to the network 105 without substantially processing and/or modifying the raw output of the encoding engine 314. In such implementations, the GPU chip 310 encapsulates video data to include network protocol headers that are associated with the host NIC 350 so that the NIC 350 can output the video data as network data packets with minimal processing. Encapsulation, in such implementations, can be accomplished before encoding, e.g., during the rendering stage, or alternatively, during or after encoding. For example, the encoding module 314 can transmit the encoded video data 301 to addresses immediately following where the network protocol headers are stored. Network data packets typically require that cyclic redundancy checks (CRCs) be computed, which can be accomplished by a dedicated on-chop CPU on the NEGPM (as described in FIGS. 4A and 4B), by executing code on the GPU chip 310, using custom hardware, or other suitable means. Once constructed, the host NIC 350 can transmit the network data packets to the network 105 in a manner that bypasses host resources other than the peripheral interconnect 302C, e.g., resources associated with the host CPU 330 and the host memory 340.

In other implementations, the host NIC 350 can be an active NIC that is capable of automatically encapsulating the raw output of the GPU chip 310 without requiring that the components of the GPU chip 310 perform the encapsulation. In such implementations, the host NIC 350 is capable of computing CRCs (and all other operations) needed to encapsulate raw video data into network data packets. In one example, raw video data is stored in the graphics memory 320 and then sent to the host NIC 350 using a DMA operation of the peripheral interconnect 302C, as shown with the example depicted in FIG. 3B. Alternatively, in another example, the GPU chip 310 transmits its output while the output is being generated, which allows the host NIC 350 to begin encapsulation and transmission even before rendering and/or encoding is complete. In this example, the GPU chip 310 is capable of transmitting raw output data in segments such that completed segments are encapsulated by the host NIC 350 while other subsequent segments are being processed by the GPU chip 310, thereby reducing the overall processing and transmission time associated with video data that includes multiple segments.

In some implementations, the server systems 300A and 300B can include a separate encoder, e.g., a software-based encoder or a hardware-based encoder, which is physically located outside of the GPU chip 310. The separate encoder can perform encoding operations to generate the encoded video data 301 without using memory bandwidth of the graphics memory 320. In such implementations, the rendering module 312 reads raw video data from the graphics memory 320 and transmits rendered video frames to the separate encoder to perform, for example, the compression techniques as discussed above. The separate encoder can be configured to transmit portions of video data to the host NIC 350 to allow overlapping of video encoding and network transmission, thereby reducing overall latency.

Figure 4C:
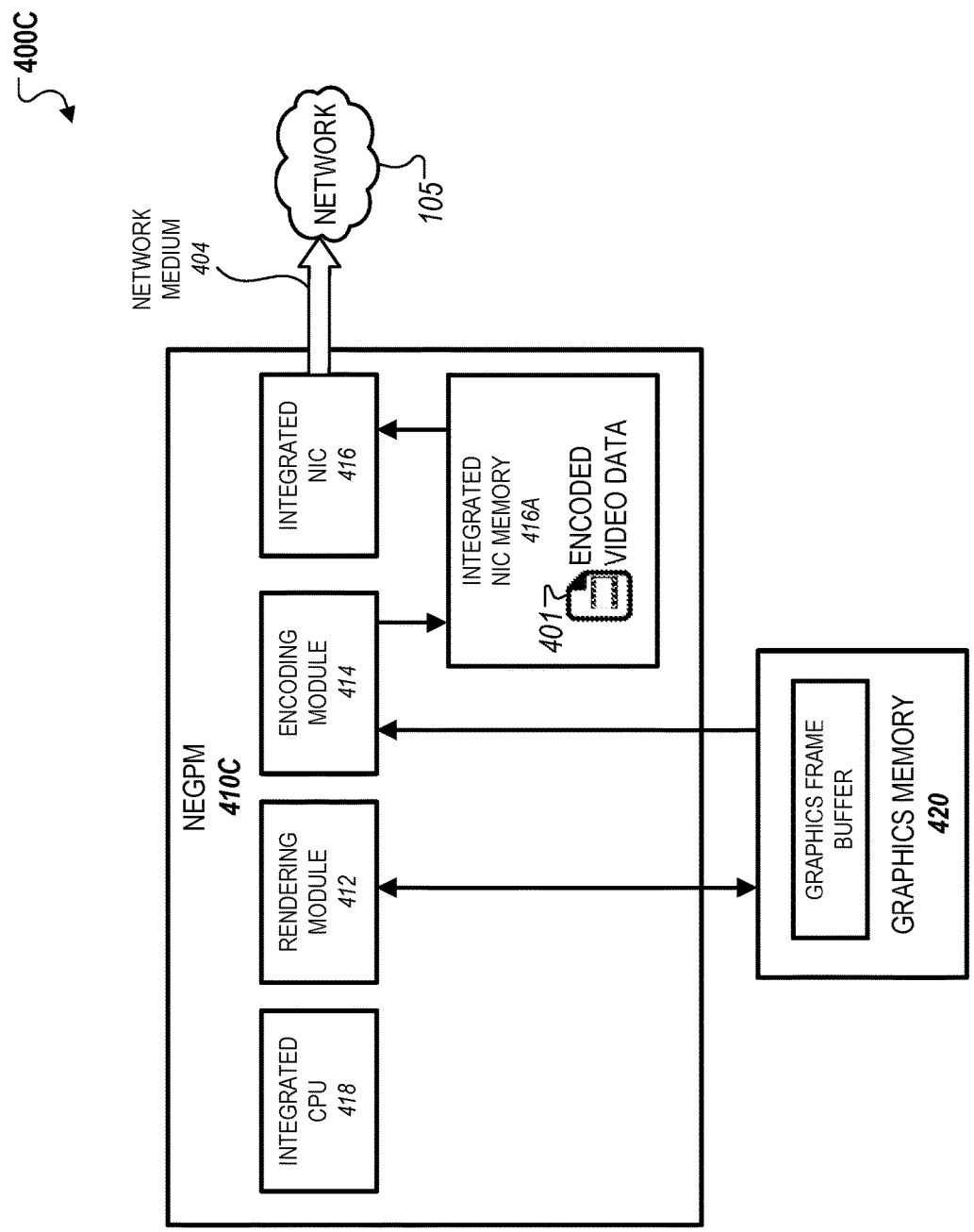

FIGS. 4A-C illustrate examples of server systems 400A, 400B, and 400C that are capable of using specialized hardware to reduce latency in providing interactive services within a virtual computing environment. As discussed above, the specialized hardware includes a NEGPM that enables the server systems 400A-C to reduce excessive latencies that can result in delays perceived by the user between input action responses.

Server systems 400A-C include NEGPM 410A-C that bypass host resources, e.g., resources associated with a host CPU of a server system, in the rendering, encoding, and transmission of video data to be provided to a client device over a network. The NEGPM 410-C include a GPU unit (not shown), which further includes a rendering module 412 and an encoding module 414. Although NEGPM 410A includes a dedicated NIC 416 (but not a dedicated CPU), the NEGPMs 410B and 410C include a dedicated NIC 416 as well as a dedicated CPU 418, which are separate from, and function independently of, a host NIC and a host CPU of the server systems 400B and 400C. Examples of a host CPU and host NIC are the host CPU 330 and the host NIC 350 as depicted in FIGS. 3A and 3B.

The server systems 400A-C include a graphics memory 420 where video data, e.g., one or more video frames rendered by the rendering module 412 or video data encoded by the encoding module 414, can be temporarily stored before encapsulation and transmission to the network 105 over the network medium 404 through the integrated NIC 416. The components of the server systems 400A-C may have similar functionalities as discussed above with respect to rendering, encoding, encapsulation, and/or transmission as discussed above.

Referring initially to FIG. 4A, the server system 400A includes a host CPU 430 that includes software 432 and a GPU driver 434. The GPU driver 434 enables the host CPU 430 to command the NEGPM 410A through the peripheral interconnect 402. In this example, the NEGPM 410A does not include a dedicated CPU, and therefore, operations performed by the NEGPM 410A are performed in part by accessing host resources such as resources of the host CPU 430 through the peripheral interconnect 402.

As depicted in FIG. 4A, encoded video data 401 generated by the encoding module 414 can be temporarily stored in the graphics memory 420 and then transmitted directly to the integrated NIC 420 without accessing host memory associated with the host CPU 430. Components on the NEGPM 410A, such as the rendering module 412, the encoding module 414, and the integrated NIC 416 can be configured to have standardized access to the graphics memory 420 using, for example, other custom logic. Access to the graphics memory 420 can be provided via a peripheral interconnect, e.g. where some PCI Express lanes are reserved for intra-module communication, or any other kind of interface provided by the components for connecting to peripherals to the graphics memory 420.

The NEGPM 410A can be configured such that it does not provide a canonical means for external agents, e.g., the host CPU 430, to access the graphics memory 420. In such implementations, the NEGPM 410A instead provides access to the encoded video data 410 through other means, such as general-purpose I/O ports on the in-chip GPU (not shown). Another technique involves snooping of the in-chip GPU to write to the graphics memory 420, e.g., by tapping DRAM signals, spoofing a DRAM chip, e.g., using custom logic pretending to be a DRAM chip, or use of dual-ported DRAM chips, among others. For example, the integrated NIC 416 can include a video output controller that is used to read out the encoded video data 401 to a standard video interface, e.g., DVI or DisplayPort, and subsequently de-serialized to binary data.

As shown in FIG. 4A, the host CPU 430 includes software 432 that commands the NEPGM 410A over the peripheral interface 402. In this example, there is no standard NIC driver. Instead, the host CPU 430 performs control over the integrated NIC 416 of the NEGPM 410A using a custom GPU driver 434 that manages the steps of rendering, encoding, and transmitting video. Graphics rendering can be performed by the rendering module 412 in a manner similar to that of a traditional GPU, e.g., to a drawing surface or a graphics framebuffer that is an allocated address range in the graphics memory 420.

When the rendering module 412 has completed rendering a video frame, the image is handed off to the encoding module 414, e.g. an H.264 encoder, which outputs the encoded video data 401 to another allocated area of the graphics memory 420. In some implementations, the rendering module 412 can be configured to begin rendering to another allocated framebuffer while the encoding module 414 is compressing the prior video frame. In such implementations, the NEGPM 410 reduces the overall time associated with rendering and encoding video data by simultaneously rendering certain video frames while encoding other video frames.

In the example depicted in FIG. 4A, the output of video output controller of NIC 416 is not configured to transmit or output video data to a monitor. Instead, the video output controller is configured to transmit the encoded video data 401 through a physical video interface, e.g. DVI or DisplayPort. A decoder that converts the encoded video data 401 (typically serial and differentially encoded) back into parallel digital signals can receive the encoded video data 401 that is outputted by the video output controller. The decoder can be connected to the integrated NIC 416, e.g., through some glue logic, that then sends the encoded video data 401 as network data packets to the network 105 over the network medium 404, e.g. Ethernet. As described herein, "glue logic" can refer to any custom circuitry, e.g. FPGA, CPLD, or ASIC, required to interconnect other chips (typically COTS chips), which can be discrete or may reside on an existing COTS chip, e.g. a COTS CPU with integrated FPGA.

In some instances, some glue logic can be used between the video decoder and integrated NIC 416 to perform processing operations to convert video data to network packet data, e.g., reformatting data for the network, converting signal levels, matching data rates, providing limited buffering, etc. The encoded video data 401 is also encapsulated to include network protocol headers prior to transmission over the network medium 404 using similar techniques as described in reference to FIGS. 3A-B. As discussed above, the encapsulation can be performed by the host CPU 430, some dedicated circuitry on the NEGPM 410A, or the integrated NIC 416 itself.

In some implementations, the video output controller and the video decoder (not shown) of the NEGPM 410A utilize minimal glue logic, and the integrated NIC 416 implements the physical network layer. In such implementations, executable code runs, e.g., by an integrated GPU, to format the encoded video data 401 as network packet data and network medium frame (e.g. UDP and Ethernet frame). In other implementations, the glue logic is more substantial and implements the network protocol of the integrated NIC 416. In some other implementations, the integrated NIC 416 can be configured to implementing one or more layers of the network protocol. In these implementations, the integrated NIC 416 can be configured to have sufficient internal memory to permit the use of both unreliable protocols (e.g. UDP/IP) and reliable protocols (e.g. TCP/IP).

Referring now to FIG. 4B, the server system 400B includes a NEGPM 410B that can be similarly configured to perform functions of the NEGPM 410A as discussed above with respect to FIG. 4A. However, the NEGPM 410B additionally includes a dedicated integrated CPU 418 that performs the operations described above with respect to the host CPU 430. In this regard, the integrated CPU 418 can include software and/or GPU drivers that command the GPU of the NEGPM 410B without having to use host resources over a peripheral interconnect. In this regard, the NEGPM 410B can perform rendering, encoding, and/or transmission of video data entirely without accessing host resources of the server system 400B. The other components of the NEGPM 410B, such as the rendering module 412, the encoding module 414, and the integrated NIC can be configured to perform similar operations as discussed above with respect to FIG. 4A.

Referring now to FIG. 4C, the server system 400C includes a NEGPM 410C that can be similarly configured to perform functions of the NEGPMs 410A and 410B as discussed above with respect to FIGS. 4A and 4B. However, instead of temporarily storing encoded video data in the graphics memory 420, as depicted in FIG. 4B, the NEGPM 410C directly transmits the encoded video data 401 to integrated NIC memory 416A in a manner similar to the transmission technique depicted in FIG. 3B. In this regard, the NEGPM 410C can further reduce latency by avoid temporarily storing the encoding video data 401 in the graphics memory 420, which can potentially introduce propagation delays.

As discussed above, the NEGPMs 410-C can reduce latency by using customized hardware architectures that remove, reduce, and/or avoid aspects of latency-critical processes such as video encoding, network transmission, among others, to, for example, reduce I/O bottlenecks and increase overlap of processing operations. For example, as discussed above, the NEGPMs 410A-C include a dedicated integrated NIC 416 that can potentially improve I/O throughout relative to a standard GPU. As another example, the architecture of the NEGPMs 410A-C to implement overlapping processing operations allow video encoding to operate progressively and consuming less framebuffer data while being generated.

In some implementations, video data can be processed as follows. The framebuffer of the graphics memory 420 can initially be rendered by the rendering module 412 of the NEGPMs 410A-C in a manner similar to a video renderer of a standard GPU. The encoding module 412 then reads the framebuffer and encodes the rendered video frames to generate the encoded video data 401. The encoded video data 401 can then transmitted directly to the integrated NIC 416 for encapsulation and transmission to the network 105 over the network medium 404. The encoded video data 401 is encapsulated to include network protocol headers, which can be performed by either the encoding module 412, some intervening logic, or the integrated NIC 416.

In other implementations, video data can be processed using alternative techniques. The rendering module 412 of the NEGPMs 410A-C initially renders the framebuffer using a standard technique, such as sort-last rendering. In these implementations, however, as pixels are written to the framebuffer, the encoding module 414 intercepts the written pixels and encodes them immediately or after a minimum amount of buffering. When pixels are painted again, the encoding module 414 can re-encode them for output as encoded video data 401. In this scenario, the logic of the encoding module 414 can be kept busy (thereby using more power) but does not necessarily impose any additional time overhead, and the encoded video data 401 is available for transmission immediately or very shortly after the framebuffer rendering completes.

In some other implementations, video data can be processed as follows. The rendering module 412 of the NEGPMs 410A-C initially renders the framebuffer in a tiled pattern (also referred to as a sort-middle pattern). In these implementations, the framebuffer is divided into a number of rectangular regions called "tiles," and the rendering module 412 renders exclusively to one or more tiles before moving on to subsequent tiles. In this scenario, the encoding module 414 has access to fully committed subsections of the framebuffer and can begin compressing these subsections immediately as they are completed. As a result, encoded video data for tiles can be transmitted to the network 105 via the integrated NIC 416 as it is computed. This scenario has the advantage of overlapping all three of rendering, encoding, and transmission steps, substantially reducing latency.

In some implementations, the server systems 400A and 400B can include a separate encoder, e.g., a software-based encoder or a hardware-based encoder, that is physically located outside of the NEGPM 410. The separate encoder can perform encoding operations to generate the encoded video data 401 without using memory bandwidth of the graphics memory 420. In such implementations, the rendering module 412 reads raw video data from the graphics memory 420 and transmits rendered video frames to the separate encoder to perform, for example, the compression techniques as discussed above. The separate encoder can be configured to transmit portions of video data to the integrated NIC 416 to allow overlap of video encoding and network transmission, thereby reducing overall latency.

The various server configurations discussed above are intended to be exemplary and can be varied in the following ways to reduce latency. For example, in addition to improving performance by removing delays and bottlenecks, component integration, e.g., on single chip, can also result in reduction in energy usage associated with processing video data. As discussed above, integration can reduce energy by eliminating external chip interfaces, which often use energy than integrated interconnects. As another example, the techniques discussed herein can also be used to improve the speed of server processing. By speeding up processing, server components may experience more idle time, which then enables switching to lower-power states. Other techniques to improve energy consumption can include a distributed network of server systems that collectively operate within a virtual computing network. By distributing a virtual computing environment amongst multiple server systems, each individual server system can consume less power during a streaming session with one or more client devices.

Additionally, as discussed above, a NEGPM can include a GPU and a dedicated CPU integrated on a single chip. In such implementations, the CPU and GPU can be configured to share caching and physical memory spaces, and data can be shared between the components without any copying or peripheral interconnect overhead. In some instances, either the CPU or the GPU can be programmed to directly access a rendered frame buffer and compress it, with the possibility of sending encoded data to the network as it is computed without requiring a dedicated video encoder. If a dedicated video encoder does exist, then it too can be configured to have direct access to the framebuffer, allowing the video encoder to access both compressed and uncompressed video data in the same memory space and also avoid extra data transfers across a peripheral interconnect. The CPU and GPU can also share a last-level cache, thereby reducing host memory bandwidth requirements.

In some implementations, an NEGPM can integrate a CPU, a GPU, and a NIC onto the same chip. In such implementations, the NEGPM can eliminate all peripheral interconnect overhead and possibly reduce host memory bandwidth requirements. Such a customized architecture can also permit dedicated video encoders to send encoded video directly to the integrated NIC, also reducing main memory bandwidth requirements and overlapping video processing steps.

As described herein, no assumptions are made about the performance of system components such as the CPU, GPU, or memory system. Such components may be implemented by high-performance server components or low-power mobile architectures. For mobile architectures, system integrators can be used to assemble any desired arrangement of circuit IP blocks, including CPUs, GPUs, NICs, substantial amounts of integrated DRAM, and FPGA blocks. Whereas high-performance systems can use virtualization to share resources among many users, custom low-power system-integrated chips (SoCs) can be shared among fewer users each but also require substantially less power and could be installed in data centers in much larger numbers for the same energy requirements. Moreover, such designs can make it more straightforward to implement the latency-reducing techniques presented elsewhere in this document.

Figure 5:
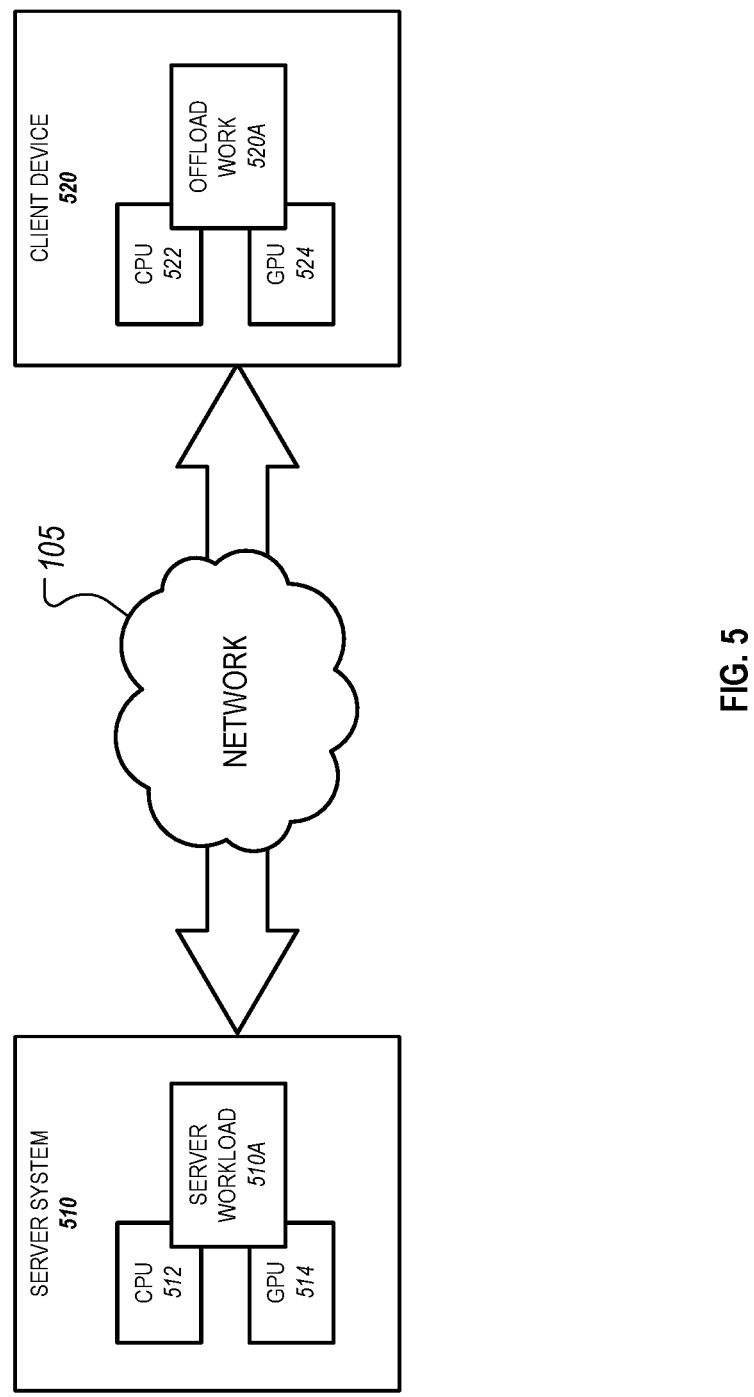
FIG. 5 illustrates an example of a client-server architecture that can be used to render video data transmitted within a virtual computing environment.

FIG. 5 illustrates an example of a client-server architecture 500 that can be used to improve rendering for video data transmitted within a virtual computing environment. The architecture 500 generally includes a server system 510 and a client device 520 that exchange communications over the network 105. The server system 510 further includes a CPU 512, which can be a host CPU or an integrated CPU of a NEGPM, and a GPU 514, which can be a COTS GPU or a GPU of the NEGPM. The server system 510 executes server workload 510A that can include rendering techniques discussed in detail below. The client device 520 further includes a CPU 522 and a GPU 524, which collectively process offload workload 520A, which in some instances, can be distributed with the server workload 510A. In some implementations, the client device 520 can correspond to the client devices 120 and 220, and the server system 510 can correspond to any of the server systems 110A, 110B, 300A, 300B, 400A, and 400B.

In the example depicted in FIG. 5, video processing operations are generally performed on the server system 510, e.g., using the server workload 510A, although certain aspects of video processing can be performed on the client device 520, e.g., as offload work 520A. For example, the offload work 520A can include decoding encoded video included within network packet data received from the server system 520 and displaying the decoded video on a display associated with the client device 520. In other examples, the offload work 520A includes a greater portion of video processing that is typically performed on the server system 510, as discussed below. In such implementations, the architecture 500 can be used to enable a distributed processing arrangement between the server system 510 and the client device 520 whereby different processing operations can be split between the server system 510 and the client device 520. Such a distributed processing arrangement can be configured with server systems other than the server system 510 discussed elsewhere within this document.

In some implementations, the server system 510 and the client device 520 can be configured to distribute video rendering using a distributed processing arrangement discussed above. For example, in the area of graphics processing, rendering can be split in different ways. In some instances, the server GPU 514 performs geometry processing, screen space transformations, vertex shading, and hidden surface removal. In such instances, the client device 520 performs the remaining steps of rendering only a single layer of the final image, e.g., fragment shading, texture mapping, etc. In other instances, the server system 510 and client device 520 may fully render different portions of the frame buffer, with the workload adaptively split between the two. Other examples of graphics offload to the client device 520 include rendering that is not latency-sensitive, such as rendering backgrounds, like skies, clouds, and other distant objects.

Other techniques to reduce the server workload 510A can include configuring the GPU 514 render to an intermediate non-pixel representation. For example, instead of textures stored as pixels, textures could be represented and drawn in the frequency domain, allowing an encoder associated with the GPU 514 to more directly and inexpensively compute discrete cosine transform (DCT) components for compressed video.

Video encoding overhead can also be reduced by configuring the offload work 520A to include some rendering. For instance, textures can be sent to and cached on the client device 510. When a frame is being rendered that includes any of these textures, the rendering of client-cached textures can be skipped by the GPU 512. Instead, appropriate metadata is sent to the client device 520 so that the texture is rendered onto the decoded video by the client device 520.

Additionally, geometry information known to the GPU 512 can be used to inform an associated video encoder about motion. For example, video encoders often utilize "motion compensation" as part of compression. Consecutive video frames can be compared to determine if any translations and/or rotations have occurred, and this is utilized to further reduce inter-frame differences that are then typically encoded by frequency domain analysis, e.g., the DCT coefficients usually used to represent macroblocks in MPEG and h.264 encodings. Given only video frames, motion compensation analysis can require an expensive search algorithm. But with high-level knowledge from geometry information known to the GPU 512, some of this search process can be avoided.

In some implementations, how the server workload 510A divided between the server device 510 and the client device 520 need not be limited to graphics. Idle time on CPU and GPU resources that can be utilized on low-performance client devices to improve server performance and reduce latencies in combination with techniques discussed throughout this document. For example, the server system 520 can use dynamic binary translation and bytecode manipulation to execute application code that normally runs on the server system 510 for migration on the client device 520. Dynamic binary translation (for ahead-of-time compiled languages like C++) and bytecode manipulation (for just-in-time compiled languages like Java and C#) are examples of methods of automatically rewriting application code to accomplish this. In such examples, application code can undergo various manipulation, such as converting direct function calls to remote function calls, to allow parts of applications to be extracted and executed remotely on the client device 520.

The distribution techniques discussed above can allow, for example, user interface components of an application to be executed on the client device 520, or virtually eliminating (or substantially eliminating) user interface latencies. Additionally, spare computing resources on clients can be generally utilized for arbitrary computation, which can be related or unrelated to the applications being hosted on the server system 510.

Another example of activities of the server system 510 that can be distributed to the client device 520 is network communication, e.g. communication between applications and third-party APIs. This technique can be used to reduce the overall bandwidth utilization of the server system 510. In some instances where application code can be migrated to the client device 520, network-related code could be included in the migrated code, thereby reducing network activity of the server system 510 for many applications such as multiplayer games and audio/video conferencing applications.

Other communication related, or unrelated to, specific applications can also be offloaded to the client device 510. For example, if incoming data is filtered, then the client device 520 can perform the filtering, and then send only the accepted portions to the server system 510. Outgoing data can be computed in a self-contained manner, which is generated on the client device 520 such that client-server communication is limited to high-level commands. If the server system 510 needs to send compressible data to a third-party system that is unable to be compressed, then the server system 510 can expend CPU cycles to compress the data, save network bandwidth by sending a compressed version, and then command the client device 520 to decompress the data before sending the data along to a third-party system.

In some implementations, the distribution techniques can be used to address limitations of graphics applications. For example, graphics hardware and applications are often limited by constant "frame rate" at which images are drawn and then outputted to a display device. In particular, if a video game is designed to work with a 60 Hz frame rate, then it may schedule its game logic computations and rendering to occur within about 16 milliseconds. From the perspective of remote video systems, however, 16 milliseconds creates a perceptible delay that is visible to end-users. This and other limitations can be mitigated and/or addressed by using an "over-rendering" technique. To apply this technique, the server system 520 increases the frame rate and forces the GPU 514 to implement a schedule that completes rendering in a shorter amount of time. This reduces the average delay between receiving user input and rendering a video frame that reflects a response, thereby reducing overall latency that is perceptible to the user.

Figure 6:
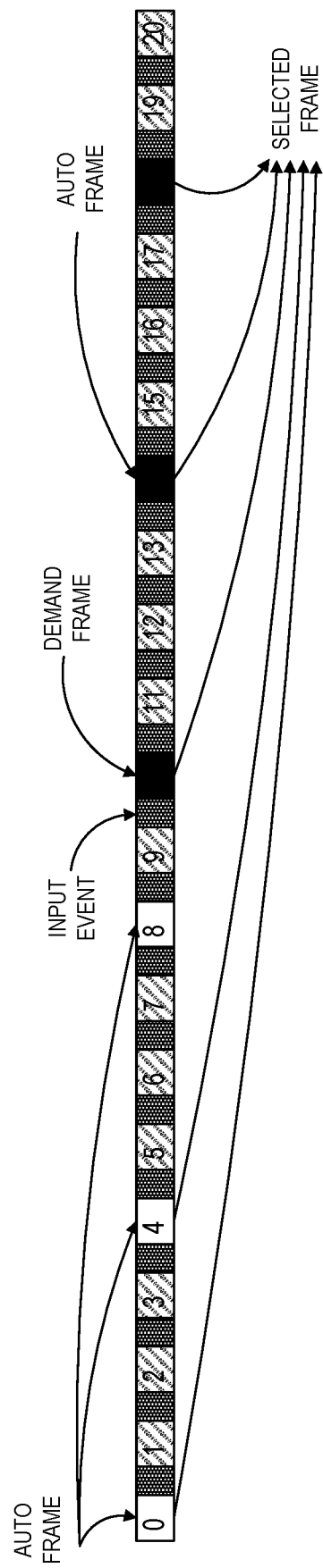
FIG. 6 illustrates an example of a video rendering technique that can be used to reduce latency associated with video data streamed within a virtual computing environment.

FIG. 6 illustrates an example of a video rendering technique that can be used to reduce latency associated with video data streamed within a virtual computing environment. The illustrated technique involves encoding a set of frames but only transmitting a subset of encoded frames. In the example depicted in FIG. 6, a client device, e.g., the client device 520, transmits every fourth rendered frame, starting from frame 0, and including frames 4, 8, and 12. In the example, user input is received just after frame 9, so the next frame captured is 10, followed by 14, 18, and so on until user input is received again and, the schedule shifts once again.

In the example depicted in FIG. 6, a user application can initially begin executing game logic and rendering a new video frame immediately after receiving input (referred to as "demand rendering"), to directly minimizing the response time. As described herein, "demand rendering" refers to a video frame that must be rendered, typically on a short deadline and not on a regular schedule. Demand-rendered frames are commonly computed in response to user input. For all other activity to be presented visually, the rendering schedule is not latency-sensitive and can be made to match the client frame rate, e.g., an average of 16.6 milliseconds apart for a 60 Hz frame rate (referred to as "automatic rendering"). The schedule for automatic rendering does not require high precision, so automatic rendering of a given frame can be delayed in favor of demand rendering by another application, e.g., in another virtual machine on the server system 520. Moreover, applications need not perform rendering on a regular schedule when internal activity would not affect the visual presentation, permitting automatic rendering to be performed over variable intervals (referred to as "event-triggered rendering").

In some implementations, to reduce rendering overhead even further, there are conditions where video can be rendered ahead of when it is needed (referred to as "pre-rendering"). Pre-rendering typically requires some ability to predict future events that will or may affect video output. For instance, if a video game character is moving at a constant velocity, then one or more video frames can be rendered ahead of time that correspond to anticipated future camera positions. Any predictable client input or other future events can be input to an application so that it generates the corresponding output, ready to be sent when input is actually received. When there is bounded uncertainty about future events, multiple possible future video frames can be pre-rendered to account for likely outcomes. When input arrives or events actually occur, the appropriate pre-rendered frame can be selected and transmitted. When input or other events deviate from expectations, only then is it necessary to perform demand-rendering.

In some implementations, pre-rendering can also be applied to deterministic or reasonably predictable events that occur on the server. For example, pre-rendering can be applied when there is no user input being responded to, but it is still beneficial to minimize the delay and delay variability between when events occur and when the user perceives the corresponding output. In this scenario, rendering can be performed arbitrarily ahead of time, in accordance with predicted future conditions, and presented to the user at a specific point in the future.

In some cases, rendering can be performed and cached for graphics outside of the user's viewport. For instance, web pages typically extend beyond the bounds of the window, as can images in image editing software. These invisible but otherwise deterministic portions of content can be pre-rendered and cached (on the server systrm 520 or the client device 510) for use when or if the user scrolls or pans to view that portion of the content.

To save even more time, pre-rendered frames can also be pre-encoded when encoder bandwidth is available. Pre-encoded frames can be sent to the client device 520 ahead of time when network bandwidth over the network 105 is available. When predictions are successful, all network delays are effectively eliminated, improving system responsiveness even under network congestion conditions. Moreover, pre-rendering can be made adaptively more aggressive in response to longer network delays, when the client device 520 and server system 510 are located geographically further away, or congestion conditions (as long as additional data does not increase congestion further).

With pre-rendering, the system provides flexibility as to when rendering, encoding, and transmission steps are performed, allowing other more urgent work, e.g. demand rendering, to have higher priority. Moreover, since pre-rendering is generally optional, this kind of anticipatory work can be queued according to priority and then processed or canceled depending on whether or not it is de-queued prior to an appropriate deadline. This ensures that anticipatory work is only performed during otherwise idle periods. Priorities can be intelligently selected on the basis of various criteria, including certainty of predictions, how critical responsiveness is for a given application, expected network delays, and other factors.

Some pre-rendering may use application support. However, in some instances, pre-rendering can be controlled entirely by the graphics driver or hardware on the GPU (or the NEGPM). For instance, part of the process of converting a three-dimensional scene from world coordinates to screen coordinates involves a ecamera transformation." The camera transformation can be altered without application knowledge and applied any number of times, allowing the same scene to be pre-rendered according to any number of possible camera positions. Even more invasive scene changes can be made as well, such as moving specific objects in space according to predicted trajectories.

When the actual scene deviates from all predicted scenes for the same time, pre-rendered video is not necessarily wasted effort. Sometimes, a predicted frame will be correct enough that the user would not notice a substitution, especially if artifacts are corrected by the next frame. Additionally, pre-rendered frames can be used to improve video compression. Typically, a video frame is encoded based on the difference between itself and the previous frame (called differential or predictive encoding). Consider a set of rendered video frames as follows:

A(t−1)—Actual video frame from one frame period in the past

A(t)—Actual video frame for the current time (that deviates from all predicted frames)

{P(t,1), . . . , P(t,n)}—The set of predicted video frames for the current time.

Typically, A(t) would be differentially compressed relative to A(t−1). However, the set of predicted frames may contain a frame that is more similar to A(t) than A(t−1) is. In that case, the encoded video sent to the client can be compressed relative to the predicted frame instead of A(t−1), saving network bandwidth usage.

To improve prediction accuracy, machine learning can be performed on the server system 510 and/or the client device 520 to model user behavior. For instance, behavior can be modeled on a per-application basis, based on probability distributions of user behavior and responses to stimuli can modeled by a Markov Decision Process (MDP). Being able to compute probabilities of future actions and/or conditions allows anticipatory work like pre-rendering to be prioritized intelligently with minimal wasted energy.

In some implementations, the system includes components that are capable of computing "state space" information representing abstractly what the application is showing the user, such as the positions of other players in a video game or the types of visible widget in a user interface. The MDP learns a "policy" that correlates application states with user actions, by way of a learning algorithm like Reinforcement Learning. From this policy, user action probabilities can be computed for known application states.

Machine learning can generally be applied in any situation where precomputing the effects of likely future events can reduce latency, enhanced by the ability to prioritize anticipatory work based on probabilities. Another example is where an application does not have direct support for pre-rendering; the graphics system can still anticipate and pre-render likely future scene transformations.

Machine learning can also be applied to application-specific trends that impact mandatory work. For instance, a balance can be maintained between video quality, encoding bit rate, and network congestion. With variable bit rate encoding, network bandwidth can be controlled by modulating quality settings for the encoder, but this typically can be done retrospectively. If one encoded frame requires an unexpectedly large number of bits, then subsequent frames will suffer in quality in order to compensate. One option would be to retry the encoding at a lower quality setting, but this would further increase delays for demand-rendered frames. Instead, it may be possible for machine learning to make informative predictions from higher-level information used by the graphics system to render the scene. In this scenario, the model might estimate the number of encoding bits for a scene, facilitating search for an optimal quality setting, or it might predict the optimal quality setting directly.

As discussed throughout, implementations discussed within this document address limitations of graphics and streaming video applications. However, the subject matter discussed within this document can be applied to other types of computer-implemented applications. For example, software-based techniques to adjust the operation of COTS GPUs, as discussed with respect to FIGS. 3A-B, and the use of customized hardware such as the NEGPM, as discussed with respect to FIGS. 4A-B, can be used provide parallelism between applications running on an OS of a server system and hardware components of the server system.

In some implementations, techniques discussed herein can be used to isolate video processing from other computation for security purposes. As an example, sensitive non-video data can be communicated to the client with encryption while not impacting video latency. Conversely, when video data is sensitive, such as with financial transactions, the video data can be encrypted without impacting other client communications through the server system. Moreover, with dedicated and/or customized hardware, encryption can be applied to video data with minimal overhead.

In some implementations, software adjusted GPU and/or the NEGPM of a server system can be configured to use GPU-accelerated computation using, for example, CUDA and OpenCL, to accelerate general-purpose computation. For example, server components may be used to perform scientific data visualization. As another example, the components can be used for general supercomputing, where a fast link between GPU and network is highly beneficial. For other examples that involve smaller computation problems, such as those used in many artificial intelligence (AI) and machine learning applications, the components may also be utilized in a low-bandwidth manner.

The virtual computing environment described herein can be provided through use of one or more server systems that operate in concert as data centers. To consolidate resources and minimize hardware idle time, a single server can host many virtual instances at one time. The host can typically be managed using a lightweight OS or hypervisor that allocates use of physical hardware resources, e.g. memory and access to peripherals to virtual machines. Each virtual machine (or "guest") can run its own OS inside of a sandbox that helps isolate virtual machines from each other, for reasons such as stability and security. Guest access to physical hardware is mediated through device drivers in the guest OS, commonly with awareness that they are within a virtual machine, which communicate with host device drivers through the secure virtualization layer.

As it pertains to graphics, guest graphics drivers can allocate memory for frame buffers, textures, and other storage from a virtual slice of the physical graphics memory that is allocated to the guest at boot time. This allocation can also be made more dynamic when guest drivers are aware of the virtualized environment and can tolerate having its portion of graphics memory be variable in size. Rendering can also be mediated using guest and host drivers, where guest driver queue rendering commands for the host driver, and the host driver manages time sharing of GPU computational resources.

Physical graphics memory is a finite resource. Commonly, guests will be allotted fixed slices of this memory, but when those slices are under-utilized by guests, then this may artificially limit the number of guests that can run on a single server, when graphics memory is fully allocated. Alternatively, the host graphics driver can dynamically allocate individual blocks of physical graphics memory for guest applications, but challenges arise when guests attempt to allocate excessive amounts of memory or when physical graphics memory is completely filled. The former can be managed by imposing limits, but the latter can be challenging when memory management determines that the optimal block to be evicted is owned by a different virtual machine than the one that is attempting to allocate.

To provide a concrete example, consider physical graphics memory of size 128 GB. A data center may charge users, in part, based on how much graphics memory is allocated to their virtual machine. If every user on a server were to subscribe to 4 GB worth of capacity, then allocating all of that memory in advance would limit the server to 32 concurrent users. However, if each user, on average, only used 3 GB, then smarter allocation would raise that limit to about 42 users. When total capacity is exceeded, various solutions exist, including migrating VMs to other hosts.

Compute time on host CPU, GPU, video encoders are also limited resources, along with network bandwidth. When any of these resources is fully utilized and becomes a bottleneck, overall system performance will slow down, resulting in increased latencies for user applications, and necessitating that one or more VMs be migrated to other host, or other mitigation methods.

Figure 7A:
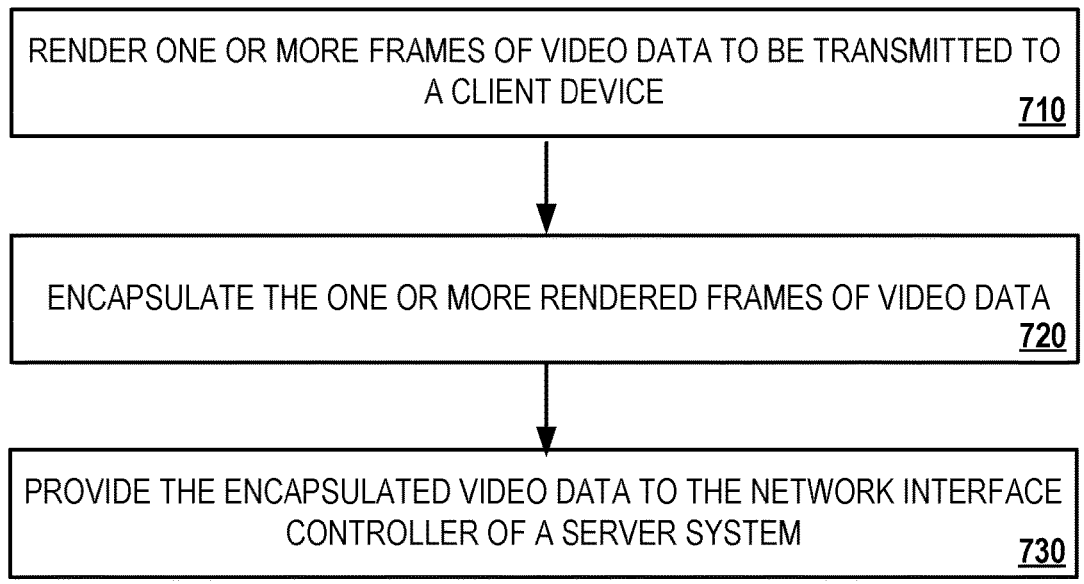
FIGS. 7A-B illustrate examples of processes for providing interactive services within a virtual computing environment through a server system.

FIG. 7A illustrates an example of a process 700A for providing interactive services within a virtual computing environment through a server system that uses a software-based technique to reduce latency. Briefly, the process 700A can include the operations of rendering one or more frames of video data to be transmitted to a client device (710), encapsulating the one or more rendered frames of video data (720), and providing the encapsulated video data to a network interface controller of a server system (730).

In general, the operations of the process 700A can be performed by a system that includes a server system with COTS hardware running customized software, such as the system 100A depicted in FIG. 1A. The operations of the 700A can generally performed to enable video streaming applications, such as gaming, between a client device and a server system as discussed throughout this document.

In more detail, the process 700A can include the operation of rendering one or more frames of video data to be transmitted to a client device (710). For example, as discussed above, the one or more frames of video can be rendered by a video render of a GPU. In some implementations, the GPU is a COTS GPU that runs customized software, such as modified GPU drivers. In this regard, the GPU may be capable of rendering video frames in a manner that produces various advantages discussed within this document. For example, as discussed above with respect to FIGS. 5 and 6, a video renderer of the GPU can perform techniques such as pre-rendering, over-rendering, demand-rendering, among others.

The process 700A can include the operation of encapsulating the one or more rendered frames of video data (720). For example, the system 100A can encapsulate the one or more rendered frames of video data to include network protocol headers that are associated with a host NIC of the system 100A. As discussed above with respect to FIGS. 3A-3B, encapsulation enables the system 100A to convert video data into network data packets that can be transmitted over the network medium 304 with minimal processing. In some implementations, encapsulation is performed by a GPU component such as the rendering module 312 or the encoding module 314. In other implementations, encapsulation is performed by software running on the server system 110A such as a software-based encoder that is independent of the GPU 116A. In some other implementations, the encapsulation is performed by the host NIC 112A, which, in such implementations, is capable of processing and converting video data encoded by the GPU 116A (or a software-based encoder) to network data packets to be transmitted to the client device 120 over the network 105.

The process 700A can include the operation of providing the encapsulated video data to a network interface controller of a server system (730). For example, as discussed above with respect to FIGS. 3A and 3B, the encapsulated video data can be transmitted to host NIC 350 of the server systems 300A and 300B. In some implementations, as depicted in FIG. 3A, the encapsulated video data can be temporarily stored in the host memory 340 of the server system 300A before being provided to the host NIC 350. In other implementations, as depicted in FIG. 3B, the encapsulated video data can be directly transmitted to, and stored in, the NIC memory 352 associated with the host NIC 350. In such implementations, the transmission can be performed using a DMA operation that can be performed by the encoding module 314 or by the host NIC 350.

Figure 7B:
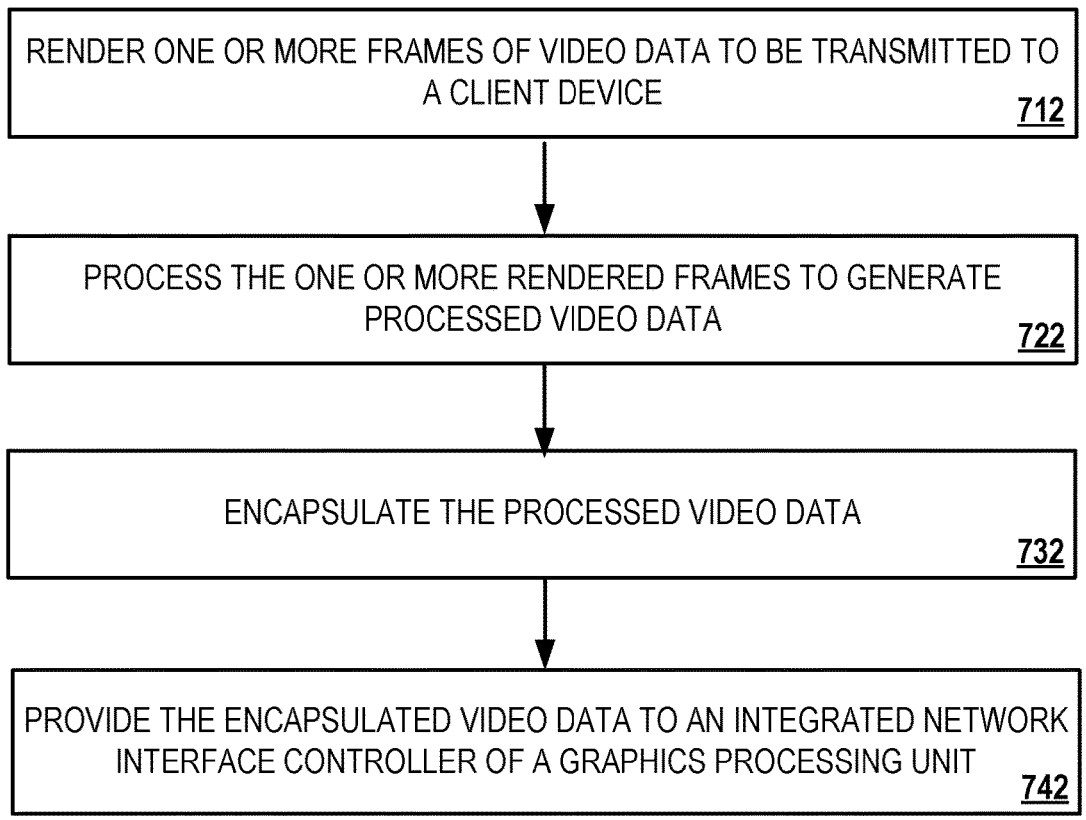

FIG. 7B illustrates an example of a process 700B for providing interactive services within a virtual computing environment using a server system that includes a hardware-based technique to reduce latency. Briefly, the process 700B can include the operations of rendering one or more frames of video data to be transmitted to a client device (712), processing the one or more rendered frames to generate processed video data (722), encapsulating the processed video data (732), and providing the encapsulated video data to an integrated network interface controller of a graphics processing unit (742).

In general, the operations of the process 700B can be performed by a system that includes a server system with customized hardware such as a NEGPM. The NEGPM can include an integrated NIC, one or more integrated CPUs, or both. As discussed above, the architecture of the NEGPM provides advantages in processing and transmitting video data by, for example, avoiding accessing host resources of a server system, or enabling direct communications between components, e.g., by reducing the need to use peripheral interconnects to exchange communications between components.

In more detail, the process 700B can include the operation of rendering one or more frames of video data to be transmitted to a client device (712). For example, as discussed above, the one or more frames of video can be rendered by a video render of a GPU. In some implementations, the GPU is a COTS GPU that runs customized software, such as modified GPU drivers. In this regard, the GPU may be capable of rendering video frames in a manner that produces various advantages discussed within this document. For example, as discussed above with respect to FIGS. 5 and 6, a video renderer of the GPU can perform techniques such as pre-rendering, over-rendering, demand-rendering, among others.

The process 700B can include the operation of processing the one or more rendered frames to generate processed video data (722). For example, the processing operation can include, without limitation, encoding the one or more rendered frames to generate encoded video data, identifying encoding parameters based on a device type of the client device that will receive the encoded video data, among others. As discussed above with respect to step 720 in FIG. 7A, the one or more rendered frames of video data can be processed by a hardware-based encoder of a GPU, a software-based encoder that runs on a server system, or in some instances, an integrated NIC of a NEGPM.

The process 700B can include the operation of encapsulating the processed video data (732). For example, as discussed above with respect to step 720 in FIG. 7A, the processed video data can be encapsulated to include network protocol headers that are associated with the on-board NIC of the NEGPM. As discussed above, the encapsulation can be performed by a variety of components of the NEGPM such as the GPU, the integrated CPUs, or the integrated NIC.

The process 700B can include the operation of providing the encapsulated video data to an integrated network interface controller of a graphics processing unit (742). For example, as discussed above with respect to step 730 in FIG. 7B, the processed video data can be provided to the integrated NIC of the NEGPM. In some implementations, as depicted in FIG. 4B, the processed video data can be temporarily stored in the graphics memory 420 of the server system 400A before being provided to the to the integrated NIC 416 of the NEGPM 410B. In other implementations, as depicted in FIG. 4C, the processed video data can be directly transmitted to the integrated NIC 416A of the integrated NIC 416 without memory temporarily stored in the graphics memory 420 of the server system 400B.

Figure 8:
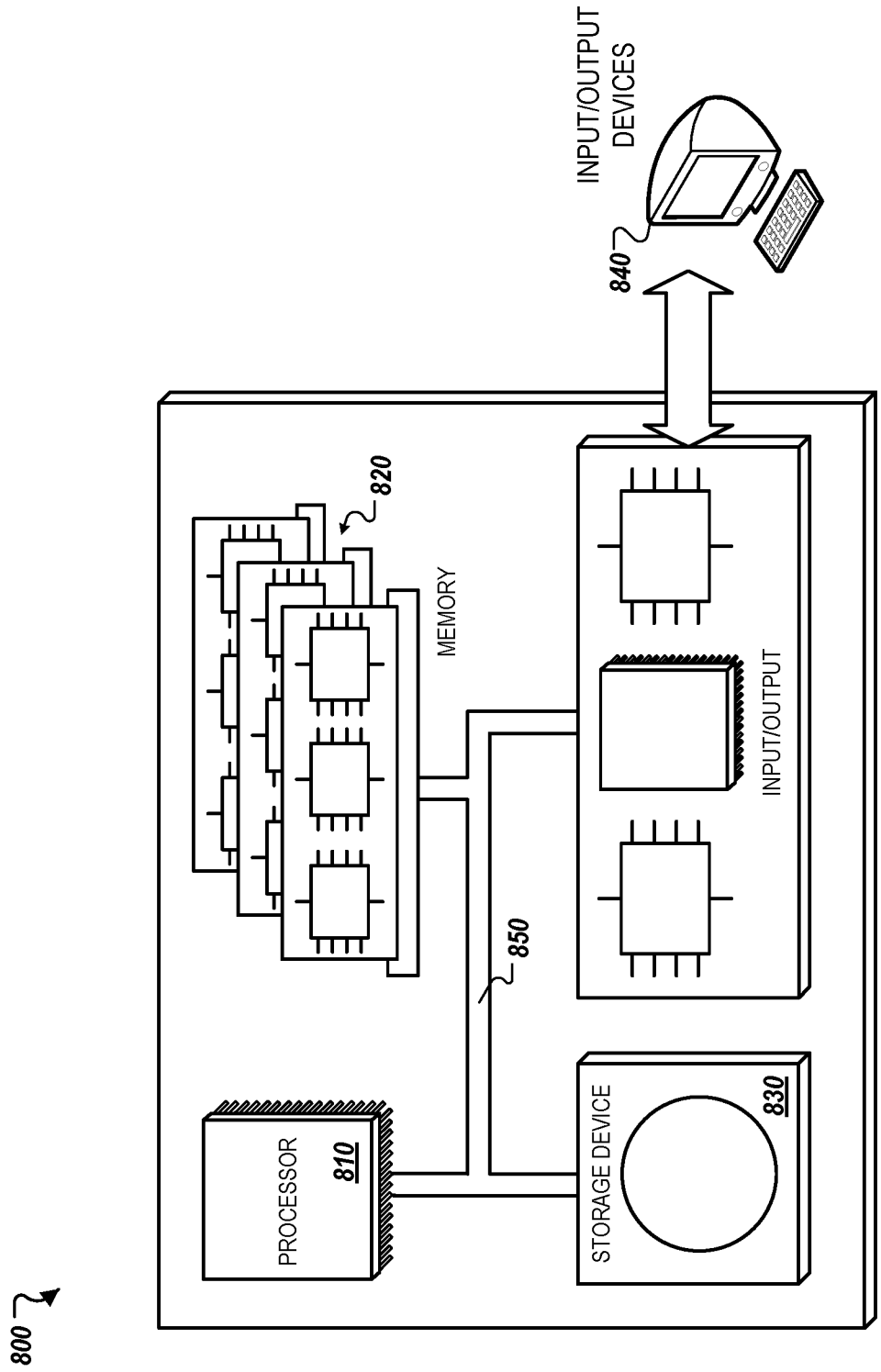
FIG. 8 illustrates examples of computing devices on which the processes described herein, or portion thereof, may be implemented.

FIG. 8 illustrates a schematic diagram of a computer system 800 that may be applied to any of the computer-implemented methods and other techniques described herein. The system 800 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 800) and their structural equivalents, or in combinations of one or more of them. The system 800 is intended to include various forms of digital computers, such as laptops, desktops, workstations, personal digital assistants, servers, blade servers, mainframes, and other appropriate computers, including vehicles installed on base units or pod units of modular vehicles. The system 800 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more central processing units;
   a graphics processing unit comprising a video renderer, a video encoder, and graphics memory and configured to use a peripheral interconnect that permits data communications between the graphics processing unit and the one or more central processing units without accessing resources of the one or more central processing units;
   a network interface controller configured to exchange data packets with client devices connected to the system over a network;
   memory associated with the network interface controller; and
   one or more non-transitory computer-readable storage devices storing instructions that, when executed by the one or more central processing units, cause the graphics processing unit to perform operations comprising:
      rendering, by the video renderer of the graphics processing unit, one or more frames of video data to be transmitted to a client device from among the client devices;
      encapsulating, by the video encoder of the graphics processing unit and within the graphics memory of the graphics processing unit, the one or more rendered frames of video data to generate encapsulated video data that includes one or more network protocol headers of the network interface controller; and
      encoding, by the video encoder of the graphics processing unit and within the graphics memory of the graphics processing unit, the encapsulated video data to generate encoded video data;

buffering, by the video encoder of the graphics processing unit and within the memory associated with the network interface controller, the encoded video data without accessing memory associated with the one or more central processing units; and providing, by the graphics processing unit and to the network interface controller, an instruction to provide a portion of the encoded video data for output while the encoded video data is being buffered within the memory associated with the network interface controller.

2. The system of claim 1, wherein encoding the encapsulated video data comprises:

encoding a first portion of the encapsulated video data;

encoding a second portion of the encapsulated video data that is different than the first portion; and storing the encoded first portion in the memory associated with the network interface controller while encoding the second portion.

3. A system comprising:

one or more central processing units;

first network interface controller;

a graphics chip comprising:
 a graphics processing unit,
 a second network interface controller, and
 memory associated with the second network interface controller, wherein:
  the graphics processing unit and the second network interface controller share caching and physical memory space on the graphics chip, and
  the second network interface controller is configured to exchange data packets with client devices connected to the system over a network without using the first interface controller; and one or more non-transitory computer-readable storage devices storing instructions that, when executed by the one or more central processing units, cause the graphics processing unit to perform operations comprising:
 rendering, by the graphics processing unit, one or more frames of video data to be transmitted to a client device from among the client devices;
 encapsulating, by the graphics processing unit, the one or more rendered frames of video data to generate encapsulated video data that includes one or more network protocol headers of the second network interface controller;
 encoding, by the graphics processing unit, the encapsulated video data to generate encoded video data;
 buffering, by the graphics processing unit and within the memory associated with the second network interface controller, the encoded video data without accessing memory associated with the one or more central processing units; and
 providing, by the graphics processing unit and to the second interface controller, an instruction to provide a portion of the encoded video data for output while the encoded video data is being buffered within the memory associated with the second network interface controller.

4. The system of claim 3, wherein:

the processed video data is encapsulated without accessing (i) graphics memory of the graphics processing unit and (ii) host memory of the system; and the encapsulated video data is encoded by the graphics processing unit without accessing the host memory of the system.

5. The system of claim 3, wherein the one or more central processing units are integrated central processing units that are configured to exchange direct communications with the graphics processing unit.

6. The system of claim 3, wherein encoding the encapsulated video data comprises:

encoding a first portion of the one or more rendered frames of video data;

encoding a second portion of the one or more rendered frames of video data that is different than the first portion; and storing the encoded first portion in the associated with the second network interface controller while encoding the second portion.

7. The system of claim 3, wherein the graphics processing unit and the one or more central processing units are housed on the graphics chip such that the graphics processing unit and each of the one or more central processing units share caching and physical memory spaces on the graphics chip.

* * * * *